US011512746B2

(12) United States Patent
Tokito et al.

(10) Patent No.: US 11,512,746 B2
(45) Date of Patent: Nov. 29, 2022

(54) CLUTCH LOCKING MECHANISM

(71) Applicant: HONDA MOTOR CO., LTD., Tokyo (JP)

(72) Inventors: Akira Tokito, Wako (JP); Junya Ono, Wako (JP); Masahiro Shimizu, Wako (JP); Kunihiro Notsu, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/427,925

(22) PCT Filed: Nov. 5, 2019

(86) PCT No.: PCT/JP2019/043239
§ 371 (c)(1),
(2) Date: Aug. 3, 2021

(87) PCT Pub. No.: WO2020/170507
PCT Pub. Date: Aug. 27, 2020

(65) Prior Publication Data
US 2022/0128101 A1 Apr. 28, 2022

(30) Foreign Application Priority Data
Feb. 22, 2019 (JP) .............................. JP2019-030655

(51) Int. Cl.
*F16D 23/12* (2006.01)
*B62H 1/02* (2006.01)
*B62H 5/00* (2006.01)

(52) U.S. Cl.
CPC .............. *F16D 23/12* (2013.01); *B62H 1/02* (2013.01); *B62H 5/00* (2013.01)

(58) Field of Classification Search
CPC .......................... F16D 2048/0254; B62H 1/02
See application file for complete search history.

(56) References Cited

U.S. PATENT DOCUMENTS 4,241,933 A * 12/1980 Gratza .................... B62H 1/02
280/301
4,638,880 A * 1/1987 Togashi ................... B62H 1/02
280/301
(Continued)

FOREIGN PATENT DOCUMENTS

EP     1985879      10/2009
JP     07-332391    12/1995
(Continued)

OTHER PUBLICATIONS

International Search Report and Written Opinion for International Application No. PCT/JP2019/043239 dated Jan. 14, 2020, 7 pages.
(Continued)

*Primary Examiner* — Stacey A Fluhart
(74) *Attorney, Agent, or Firm* — Amin, Turocy & Watson LLP

(57) ABSTRACT

A clutch locking mechanism is a clutch locking mechanism (80) mounted in a saddle type vehicle (1) and includes a clutch (26) which enters an engaged state where power can be transmitted when an actuator (28) is operated and returns to a disengaged state where power cannot be transmitted when the actuator (28) is not operated, and a locking mechanism (100) having an operator (101) which is able to bring the clutch (26) into the engaged state separately from an operation of the actuator (28).

5 Claims, 14 Drawing Sheets

(56) References Cited

U.S. PATENT DOCUMENTS

| | | | |
|---|---|---|---|
| 8,302,755 B2 | 11/2012 | Hayakawa et al. | |
| 2008/0078641 A1* | 4/2008 | Iwashita | F16D 48/06 |
| | | | 192/84.6 |
| 2012/0024651 A1 | 2/2012 | Miyazaki | |
| 2015/0284046 A1* | 10/2015 | Aguilar | B62K 23/02 |
| | | | 192/83 |
| 2018/0274607 A1* | 9/2018 | Ono | F16D 48/066 |

FOREIGN PATENT DOCUMENTS

| | | |
|---|---|---|
| JP | 2006-170228 | 6/2006 |
| JP | 2007-024216 | 2/2007 |
| JP | 2008-275084 | 11/2008 |
| JP | 2009-052678 | 3/2009 |
| JP | 2009-079607 | 4/2009 |
| JP | 2010-060106 | 3/2010 |
| JP | 2011-207296 | 10/2011 |
| JP | 2012-031901 | 2/2012 |
| JP | 2018-054044 | 4/2018 |

OTHER PUBLICATIONS

Japanese Office Action for Japanese Patent Application No. 2021-501558 dated Jul. 26, 2022.

* cited by examiner

CLUTCH LOCKING MECHANISM

TECHNICAL FIELD

The present invention relates to a clutch locking mechanism.

Priority is claimed on Japanese Patent Application No. 2019-030655, filed Feb. 22, 2019, the content of which is incorporated herein by reference.

BACKGROUND ART

Conventionally, in a saddle type vehicle, a structure having a clutch (a so-called normally-open clutch) which enters an engaged state where power can be transmitted when an actuator has been operated and which returns to a disengaged state where power cannot be transmitted when the actuator has not been operated is known. For example, in Patent Literature 1, a clutch enters an engaged state when a hydraulic pressure is applied, and the clutch enters a disengaged state when the hydraulic pressure is released.

RELATED ART DOCUMENT

Patent Document

Patent Document 1: Japanese Unexamined Patent Application, First Publication No. 2018-54044

SUMMARY

Problems to be Solved by the Invention

Incidentally, in the case of the normally-open clutch, the clutch enters the disengaged state because the actuator is not operated when the vehicle is stopped (for example, when the hydraulic pressure is released). When the vehicle is stopped on a sloping road or the like, the vehicle may slide down if the clutch is in the disengaged state.

On the other hand, in order prevent the vehicle from sliding down, it is conceivable to install a parking brake system, but in such a case, cost and weight will increase.

Therefore, an object of the present invention is to prevent a vehicle from sliding down a sloping road or the like while an increase in cost and weight is suppressed.

Means for Solving the Problem

As means for solving the above problems, aspects of the present invention have the following configurations.

(1) A clutch locking mechanism according to an aspect of the present invention is a clutch locking mechanism (80) mounted in a saddle type vehicle (1) and includes a clutch (26) which enters an engaged state where power can be transmitted when an actuator (28) is operated and returns to a disengaged state where power cannot be transmitted when the actuator (28) is not operated, and a locking mechanism (100) having an operator (101) which is able to bring the clutch (26) into the engaged state separately from an operation of the actuator (28).

(2) In the clutch locking mechanism described in (1), the clutch (26) may include a clutch center (81) which is connected to a main shaft (22), a clutch outer (82) which is provided outside the clutch center (81), and a pressure plate (83) which is moved by the actuator (28) and is able to connect the clutch center (81) to the clutch outer (82), and the locking mechanism (100) may operate the pressure plate (83) in an engagement direction (V1) by operating the operator (101).

(3) In the clutch locking mechanism described in (2), the locking mechanism (100) may include a wire (102) which is connected to the operator (101), an arm (103) which is connected to the wire (102) and is rotatable, and a clutch operating rod (104) which rotates in conjunction with rotation of the arm (103), and the locking mechanism (100) may operate the pressure plate (83) in the engagement direction (V1) by rotation of the clutch operating rod (104).

(4) In the clutch locking mechanism described in any one of (1) to (3), the actuator (28) may be provided on one side of the saddle type vehicle (1) in a vehicle width direction, and at least part of the locking mechanism (100) may be provided on a side opposite to the actuator (28) in the vehicle width direction.

(5) The clutch locking mechanism described in any one of (1) to (4) may further include a stand (79) which is able to stand the saddle type vehicle (1), and the operator (101) may be operable only when the stand (79) is in use.

(6) In the clutch locking mechanism described in (5), the operator (101) may return to a position (P1) before the operation of the operator (101) together with an operation in which the stand (79) is retracted.

Advantage of the Invention

According to the clutch locking mechanism described in (1) of the present invention, the following effects can be obtained by providing the locking mechanism having the operator capable of bringing the clutch into the engaged state separately from the operation of the actuator.

When the vehicle is stopped on a sloping road or the like, the clutch can be forcibly placed in the engaged state by an operation of the operator, so that the vehicle can be prevented from sliding down. In addition, since it is not necessary to have a parking brake system mounted, it is possible to curb an increase in cost and weight. Therefore, it is possible to prevent a vehicle from sliding down a sloping road or the like while an increase in costs and weight is curbed.

According to the clutch locking mechanism described in (2) of the present invention, the clutch includes the clutch center which is connected to the main shaft, the clutch outer which is provided outside the clutch center, and the pressure plate which is moved by the actuator and can connect the clutch center to clutch outer. The locking mechanism operates the pressure plate in the engagement direction by the operation of the operator. With such a configuration, the following effects can be obtained.

Since existing parts such as the pressure plate can be used, it is possible to curb an increase in the number of parts and an increase in weight.

According to the clutch locking mechanism described in (3) of the present invention, the locking mechanism includes the wire which is connected to the operator, the arm which is connected to the wire and is rotatable, and the clutch operating rod which rotates in conjunction with the rotation of the arm. The locking mechanism moves the pressure plate in the engagement direction by rotating the clutch operating rod. With such a configuration, the following effects are obtained.

Since the operator and the pressure plate are mechanically connected, the clutch can be placed in the engaged state without consuming electric power or the like.

Therefore, the configuration can be inexpensive.

According to the clutch locking mechanism described in (4) of the present invention, the actuator is provided on one side of the saddle type vehicle in the vehicle width direction, and at least part of the locking mechanism is provided on the side opposite to the actuator in the vehicle width direction, thereby achieving the following effects.

Since the actuator and the locking mechanism are disposed separately in the vehicle width direction, it is possible to curb an increase in size to one side in the vehicle width direction. In addition, an influence on a bank angle and the like can be reduced.

According to the clutch locking mechanism described in (5) of the present invention, the stand capable of standing the saddle type vehicle may also be included, and the operator can be operated only when the stand is in use, thereby achieving the following effects.

It is possible to curb an erroneous operation of the operator when the vehicle is not stopped. Therefore, it is possible to prevent an unintentional engaged state of the clutch when the vehicle is not stopped.

According to the clutch locking mechanism described in (6) of the present invention, the operator returns to a position before the operation of the operator together with the operation in which the stand is retracted, thereby achieving the following effects.

Since the engaged state of the clutch is released by the operator due to the operation in which the stand is retracted, it is possible to curb one from forgetting to release the engaged state of the clutch.

DESCRIPTION OF THE EMBODIMENTS

Figure 1:
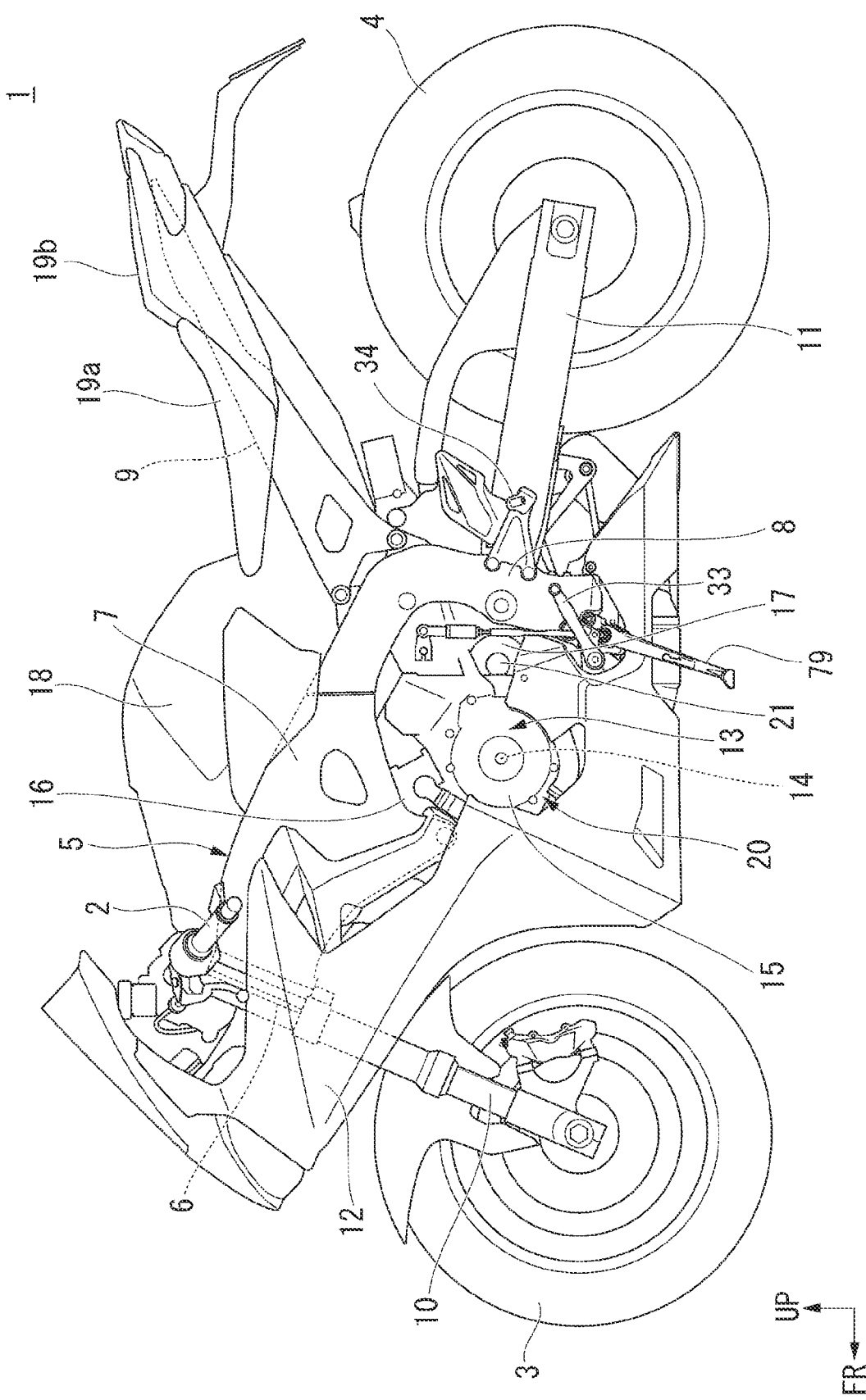
FIG. 1 is a left side view of a motorcycle of an embodiment.

Hereinafter, embodiments of the present invention will be described with reference to the drawings. Unless otherwise specified, orientations of the front, rear, left, and right directions in the following description are the same as those in a vehicle described below. Further, an arrow FR indicating the front of the vehicle, an arrow LH indicating the left side of the vehicle, an arrow UP indicating the upper side of the vehicle, and a right and left center line CL of a vehicle body which indicates the center of the vehicle in a vehicle width direction are shown at appropriate positions in the drawing used in the following description.

<Whole Vehicle>

FIG. 1 shows a motorcycle 1 as an example of a saddle type vehicle. With reference to FIG. 1, the motorcycle 1 includes a front wheel 3 steered by a handlebar 2 and a rear wheel 4 driven by a power unit 20 including a power source. Hereinafter, the motorcycle may be simply referred to as a "vehicle".

The vehicle includes steering system parts including the handlebar 2 and the front wheel 3. The steering system parts are steerably supported by a head pipe 6 at a front end portion of a vehicle body frame 5. The outer circumference of the vehicle body frame 5 is covered with a vehicle body cover 12. In FIG. 1, a reference numeral 10 indicates a front fork which pivotally supports the front wheel 3.

The vehicle body frame 5 includes the head pipe 6 which steerably supports the front fork 10, a pair of right and left main frames 7 which extend rearward and downward from the head pipe 6, pivot frames 8 which extend downward from rear portions of the main frames 7, and a pair of right and left seat rails 9 which extend rearward and upward from upper portions of the rear portions of the main frames 7.

Front end portions of swing arms 11 are swingably supported by the pivot frames 8 via a pivot shaft. The rear wheel 4 is rotatably supported by rear end portions of the swing arms 11.

A cushion unit (not shown) is interposed between the swing arms 11 and the pivot frames 8.

A fuel tank 18 is supported on upper portions of the main frames 7. The vehicle includes a front seat 19a on which a driver sits and a rear seat 19b on which a passenger sits. The front seat 19a is disposed behind the fuel tank 18 and above the seat rail 9. The rear seat 19b is disposed behind the front seat 19a.

The vehicle includes a power unit 20 which is a prime mover. The power unit 20 is supported by the main frames 7 and the pivot frames 8. An output shaft of the power unit 20 is connected to the rear wheel 4 to be able to transmit power via a chain type transmission mechanism (not shown).

The power unit 20 integrally includes an engine 13 (an internal combustion engine) and a transmission 21 located on the rear side of the engine 13. For example, the engine 13 is a multiple cylinder engine in which a rotation axis of a crankshaft 14 follows a vehicle width direction. The engine 13 includes a crankcase 15 which accommodates the crankshaft 14, and a cylinder 16 which stands up diagonally forward and upward from a front upper portion of the crankcase 15. A rear portion of the crankcase 15 is a transmission case 17 which accommodates the transmission 21. A reference numeral 79 in the drawing indicates a stand by which the vehicle can stand. The stand 79 is a foldable side stand which supports the vehicle in an upright posture tilted to the left.

<Transmission>

Figure 2:
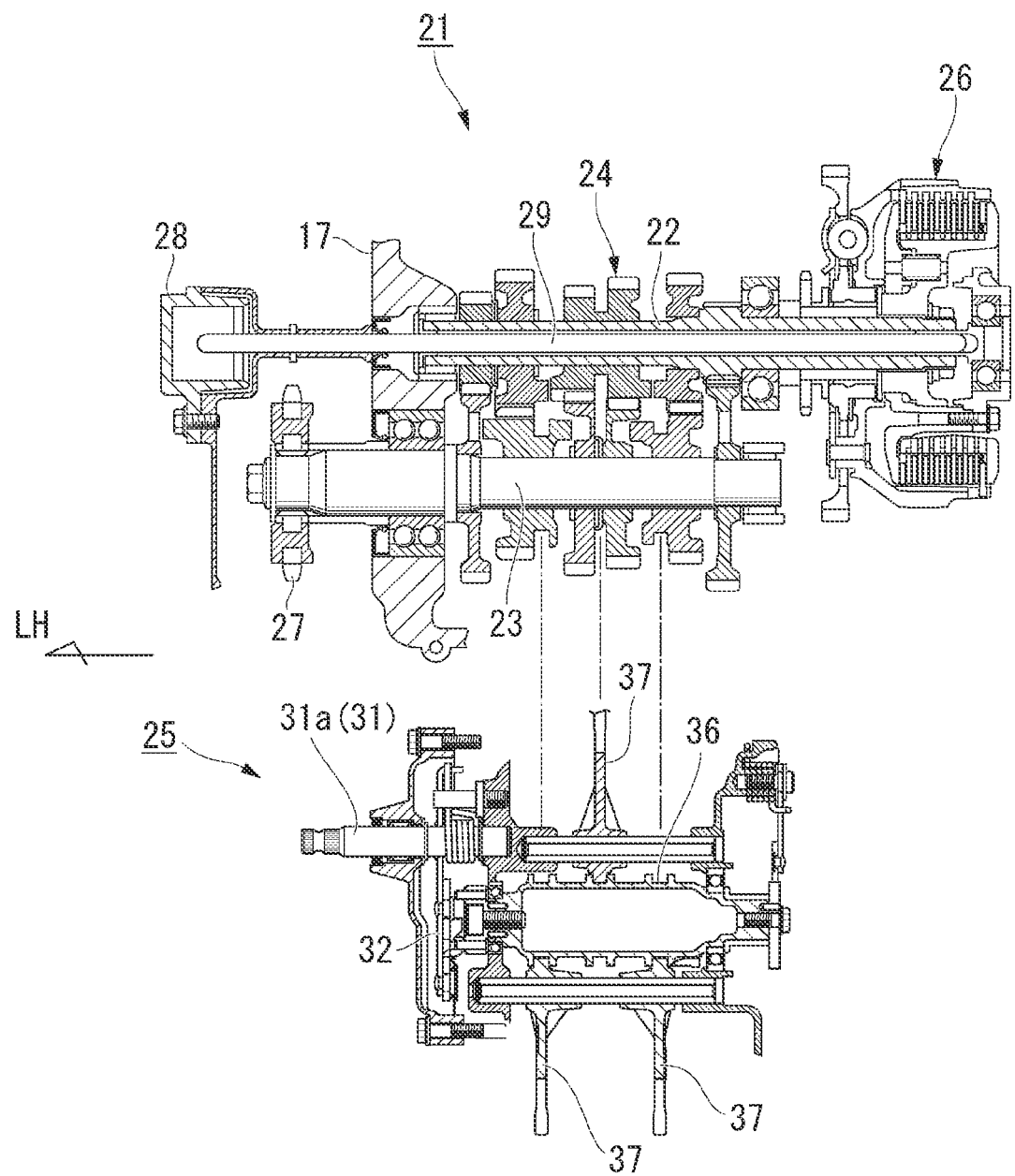
FIG. 2 is a cross-sectional view of a transmission and a change mechanism of the embodiment.

As shown in FIG. 2, the transmission 21 includes a main shaft 22 which extends in the vehicle width direction, a counter shaft 23 which is substantially parallel to the main shaft 22, and a transmission gear group 24 which straddles the main shaft 22 and the counter shaft 23. The transmission 21 is a stepped transmission. The counter shaft 23 constitutes an output shaft of the transmission 21 (the power unit 20). An end portion of the counter shaft 23 protrudes to the left side of a rear portion of the crankcase 15. The protruding end portion (the left end portion) of the counter shaft 23 is connected to the rear wheel 4 (refer to FIG. 1) via the chain type transmission mechanism.

The main shaft 22 and the counter shaft 23 are disposed behind the crankshaft 14 (refer to FIG. 1). The main shaft 22 and the counter shaft 23 are arranged side by side in a forward and rearward direction. A clutch 26 operated by a clutch actuator 50 (refer to FIG. 3) is provided at a right end portion of the main shaft 22. The clutch 26 is disposed coaxially with the main shaft 22. For example, the clutch 26 is a wet multi-plate clutch.

The clutch 26 is a so-called normally-open clutch which enters an engaged state where power can be transmitted by supplying a hydraulic pressure from the clutch actuator 50, and returns to a disengaged state where power cannot be transmitted when the supply of the hydraulic pressure from the clutch actuator 50 is stopped.

Rotational power of the crankshaft 14 (refer to FIG. 1) is transmitted to the main shaft 22 via the clutch 26. The rotational power transmitted to the main shaft 22 is transmitted to the counter shaft 23 via an arbitrary gear pair of the transmission gear group 24.

In the drawing, a reference numeral 27 indicates a drive sprocket of a chain type transmission mechanism. The drive sprocket 27 is mounted on a left end portion of the counter shaft 23.

The transmission case 17 accommodates a change mechanism 25 which switches gear pairs of the transmission gear group 24. The change mechanism 25 includes a hollow cylindrical shift drum 36 which is substantially parallel to each of the main shaft 22 and the counter shaft 23, a shift spindle 31 which is substantially parallel to the shift drum 36, a shift arm 32 (a master arm) which is fixed to the shift spindle 31, and a plurality of shift forks 37.

A pattern of lead grooves is formed on the outer circumference of the shift drum 36. The change mechanism 25 rotates the shift drum 36 via the shift arm 32 by rotation of the shift spindle 31. The change mechanism 25 moves the shift fork 37 along the pattern of the lead grooves in an axial direction by the rotation of the shift drum 36. Thus, the power-transmitting gear pair in the transmission gear group 24 is switched (that is, a shift stage is switched).

The shift spindle 31 includes a shaft outer portion 31a which protrudes outward (leftward) in the vehicle width direction of the crankcase 15 (refer to FIG. 1) in order to enable the change mechanism 25 to be operated. A shift load sensor 42 (refer to FIG. 4) is coaxially mounted on the shaft outer portion 31a of the shift spindle 31. A shift pedal 33 (refer to FIG. 1) operated by a driver's foot is mounted on the shaft outer portion 31a of the shift spindle 31 (or a rotation shaft of the shift load sensor 42) via a link rod (not shown).

As shown in FIG. 1, a front end portion of the shift pedal 33 is supported by a lower portion of the crankcase 15 via a shaft which follows the vehicle width direction. The shift pedal 33 can swing up and down via the shaft which follows the vehicle width direction. A rear end portion of the shift pedal 33 serves as a pedal portion on which toes of the driver placed on a step 34 are put.

The motorcycle 1 of the embodiment adopts a so-called semi-automatic transmission system (an automatic clutch type transmission system) in which the driver performs only a transmission operation of the transmission 21 (a foot operation of the shift pedal 33) and engagement and disengagement operations of the clutch 26 are automatically performed by electric control according to the operation of the shift pedal 33.

<Transmission System>

Figure 4:
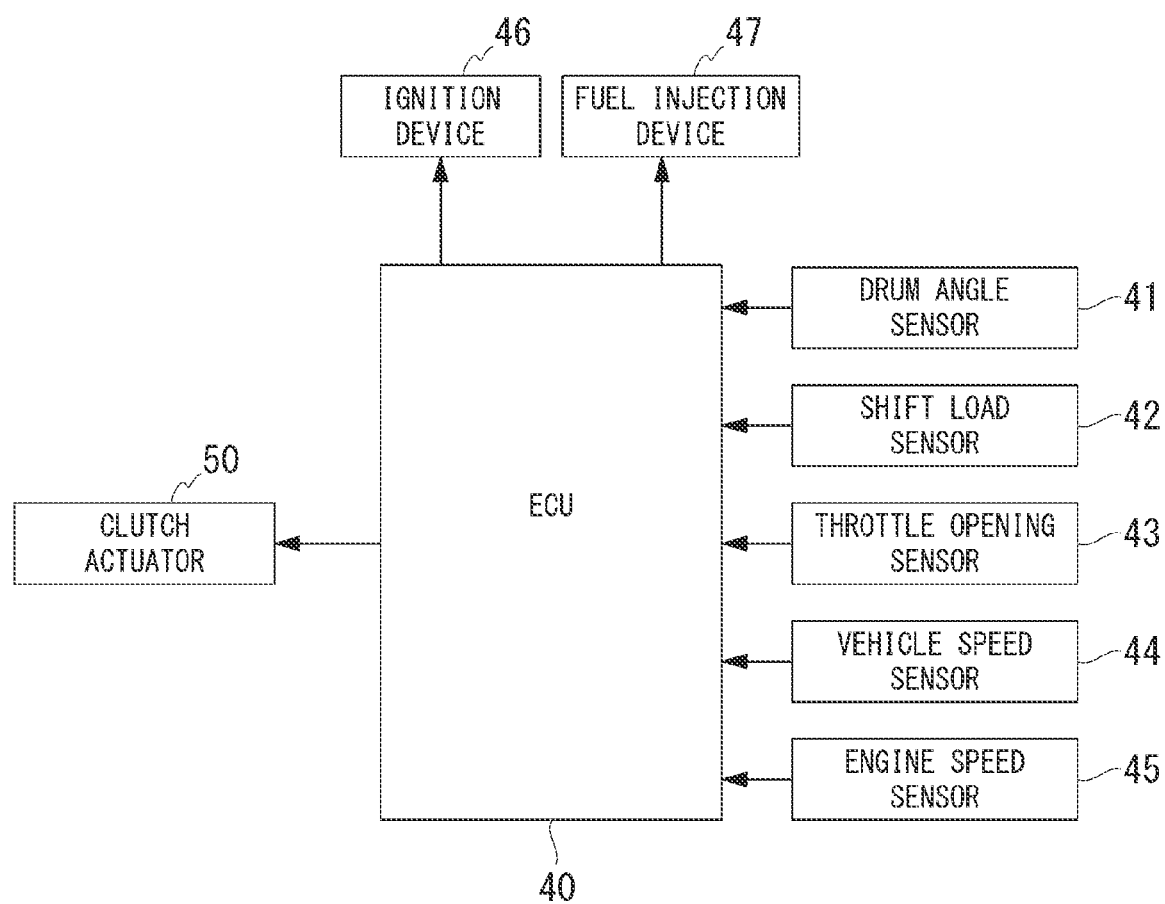
FIG. 4 is a block diagram of a transmission system of the embodiment.

As shown in FIG. 4, the transmission system includes the clutch actuator 50, an electronic control unit (ECU) 40, and various sensors 41 to 45. The various sensors 41 to 45 include a drum angle sensor 41 (for example, a gear position sensor) which detects a shift stage from a rotation angle of the shift drum 36, a shift load sensor 42 (for example, a torque sensor) which detects an operation torque input to the shift spindle 31, a throttle opening sensor 43, a vehicle speed sensor 44, and an engine speed sensor 45.

The ECU 40 controls the clutch actuator 50 and also controls an ignition device 46 and a fuel injection device 47 on the basis of detection information from the gear position sensor 41 and the shift load sensor 42, and various vehicle state detection information from the throttle opening sensor 43, the vehicle speed sensor 44, the engine speed sensor 45, and the like.

Detection information from hydraulic pressure sensors 57 and 58 (refer to FIG. 3) of the clutch actuator 50 is also input to the ECU 40.

Figure 3:
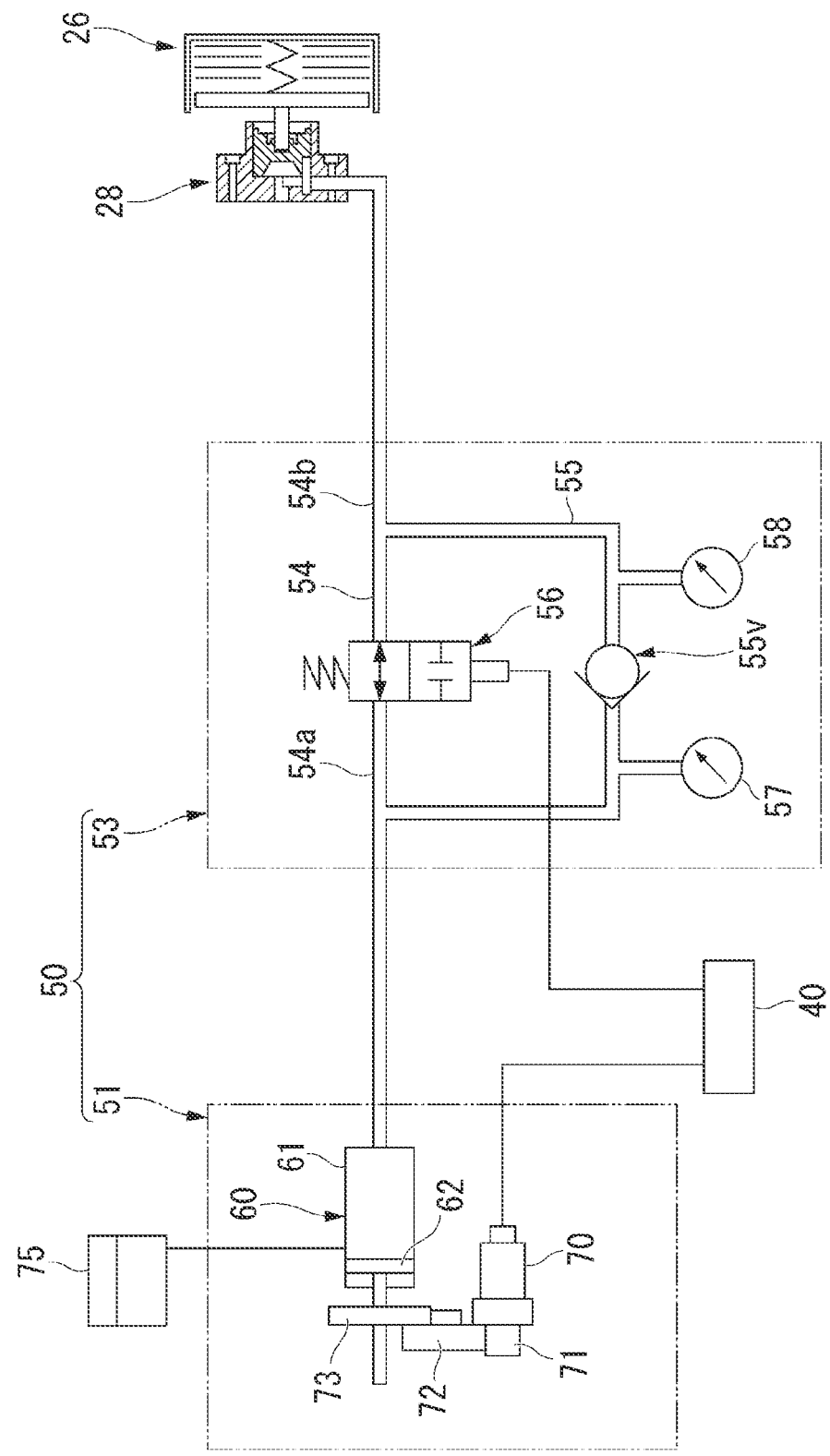
FIG. 3 is a schematic explanatory view of a clutch operating system including a clutch actuator of the embodiment.

As shown in FIG. 3, the clutch actuator 50 is controlled by the ECU 40 and adjusts the hydraulic pressure for engaging and disengaging the clutch 26. The clutch actuator 50 includes a hydraulic actuator 51 and a hydraulic valve unit 53.

The hydraulic actuator 51 includes a motor 70 (for example, an electric motor) as a drive source and a master cylinder 60 driven by the motor 70.

The master cylinder 60 strokes a piston 62 in a cylinder body 61 by driving the motor 70 so that a hydraulic oil in the cylinder body 61 can be supplied to and discharged from a slave cylinder 28. A reference numeral 75 in the drawing indicates a reserve tank connected to the master cylinder 60.

The piston 62 of the master cylinder 60 is connected to a drive shaft 71 of the motor 70 via a transmission gear 72 and a conversion mechanism 73. The conversion mechanism 73 converts a rotational motion of the drive shaft 71 and the transmission gear 72 into a stroke motion of the piston 62. For example, the conversion mechanism 73 is a ball screw mechanism.

The hydraulic valve unit 53 is provided between the master cylinder 60 and the slave cylinder 28. The hydraulic valve unit 53 includes a main oil passage 54, a solenoid valve 56 (a valve mechanism), a bypass oil passage 55, a one-way valve 55v, and hydraulic pressure sensors 57 and 58.

The main oil passage 54 is a hydraulic oil supply and discharge passage which extends from the master cylinder 60 to the clutch 26 side (the slave cylinder 28 side), and is formed to allow communication between the master cylinder 60 side and the slave cylinder 28 side. The main oil passage 54 is divided into an upstream oil passage 54a located on the master cylinder 60 side from the solenoid valve 56 and a downstream oil passage 54b located on the slave cylinder 28 side from the solenoid valve 56.

The solenoid valve 56 opens or shuts off an intermediate portion of the main oil passage 54. The solenoid valve 56 is a normally open valve.

The bypass oil passage 55 bypasses the solenoid valve 56 and allows communication between the upstream oil passage 54a and the downstream oil passage 54b of the main oil passage 54. The one-way valve 55v is provided in the bypass oil passage 55. The one-way valve 55v circulates the hydraulic oil in a direction from the upstream oil passage 54a to the downstream oil passage 54b, and restricts a flow of the hydraulic oil in a direction opposite thereto. That is, the one-way valve 55v circulates the hydraulic oil only in the direction from the upstream side to the downstream side.

The upstream side hydraulic pressure sensor 57 detects the hydraulic pressure of the hydraulic oil on the upstream oil passage 54a side.

The downstream side hydraulic pressure sensor 58 detects the hydraulic pressure of the hydraulic oil on the downstream oil passage 54b side.

As shown in FIG. 2, the slave cylinder 28 is disposed on the left side of the main shaft 22. The slave cylinder 28 is disposed coaxially with the main shaft 22. The slave cylinder 28 presses a push rod 29 passing through the inside of the main shaft 22 to the right when the hydraulic pressure is supplied from the clutch actuator 50 (refer to FIG. 3). The slave cylinder 28 operates the clutch 26 in the engaged state via the push rod 29 by pressing the push rod 29 to the right. When the supply of the hydraulic pressure is cut off, the slave cylinder 28 releases the pressing of the push rod 29 and returns the clutch 26 to the disengaged state.

In order to maintain the clutch 26 in the engaged state, it is necessary to continue the supply of the hydraulic pressure, and thus electric power is also consumed. Therefore, as shown in FIG. 3, the solenoid valve 56 is provided in the hydraulic valve unit 53 of the clutch actuator 50, and the solenoid valve 56 is closed after the hydraulic pressure is supplied to the clutch 26 side. Thus, energy consumption is curbed by maintaining the supply of the hydraulic pressure to the clutch 26 side and supplementing the hydraulic pressure by an amount of pressure drop (recharging by an amount of leakage).

<Clutch Control>

Figure 5:
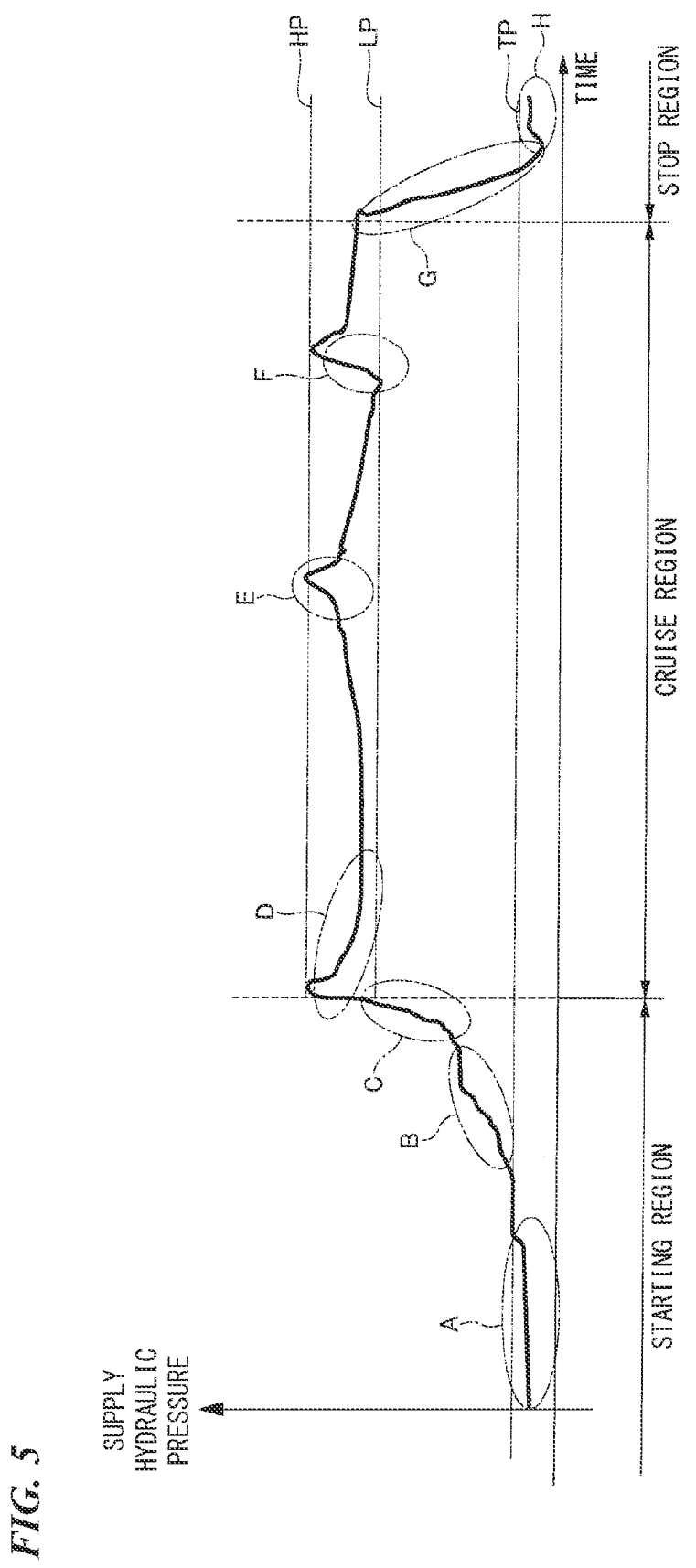
FIG. 5 is a graph showing change in supply hydraulic pressure in the clutch actuator of the embodiment.

Next, an operation of a clutch control system will be described with reference to a graph of FIG. 5. In the graph of FIG. 5, a vertical axis represents the supply hydraulic pressure detected by the downstream side hydraulic pressure sensor 58, and a horizontal axis represents an elapsed time.

When the motorcycle 1 is stopped (idles), both the motor 70 and the solenoid valve 56 controlled by the ECU 40 are in a state in which the power supply is cut off. That is, the motor 70 is in a stopped state, and the solenoid valve 56 is in a valve open state. At this time, the slave cylinder 28 side (the downstream side) enters a low pressure state lower than a touch point hydraulic pressure TP, and the clutch 26 enters a non-engaged state (a disengaged state, a released state). This state corresponds to a region A in FIG. 5.

When the motorcycle 1 starts and an RPM of the engine 13 is increased, the electric power is supplied only to the motor 70, and the hydraulic pressure is supplied from the master cylinder 60 to the slave cylinder 28 via the solenoid valve 56 in the valve open state. When the hydraulic pressure on the slave cylinder 28 side (the downstream side) rises above the touch point hydraulic pressure TP, the clutch 26 starts to be engaged, and the clutch 26 enters a half-clutch state in which some of the power can be transmitted. Thus, the motorcycle 1 can start smoothly. This state corresponds to a region B in FIG. 5.

Eventually, when the hydraulic pressure on the slave cylinder 28 side (the downstream side) reaches a lower limit holding hydraulic pressure LP, the clutch 26 is completely engaged, and the entire driving force of the engine 13 is transmitted to the transmission 21. This state corresponds to a region C in FIG. 5.

Additionally, when the hydraulic pressure on the slave cylinder 28 side (the downstream side) reaches the upper limit holding hydraulic pressure HP, the electric power is supplied to the solenoid valve 56, the solenoid valve 56 is closed, and at the same time, the supply of electric power to the motor 70 is stopped to stop generation of the hydraulic pressure. That is, the upstream side enters a low pressure state due to the hydraulic pressure applied thereto being released, while the downstream side is maintained in a high pressure state (the upper limit holding hydraulic pressure HP). Thus, the clutch 26 is maintained in the engaged state without the master cylinder 60 generating the hydraulic pressure, and the power consumption can be curbed while the motorcycle 1 is enabled to travel.

Even in a state in which the solenoid valve 56 is closed, the hydraulic pressure on the downstream side gradually decreases (leaks), as shown in a region D in FIG. 5, due to causes such as leakage of the hydraulic pressure and a temperature decrease due to deformation of seals of the solenoid valve 56 and the one-way valve 55v. On the other hand, as in a region E of FIG. 5, the hydraulic pressure on the downstream side may rise due to a temperature rise or the like. When a small fluctuation in the hydraulic pressure occurs on the downstream side, it can be absorbed by an accumulator (not shown), and the motor 70 and the solenoid valve 56 are not operated every time the hydraulic pressure fluctuates, and thus the power consumption does not increase.

When the hydraulic pressure on the downstream side rises to the upper limit holding hydraulic pressure HP as in the region E of FIG. 5, the solenoid valve 56 is gradually opened to relieve the hydraulic pressure on the downstream side to the upstream side by reducing the power supply to the solenoid valve 56 or the like.

When the hydraulic pressure on the downstream side decreases to the lower limit holding hydraulic pressure LP as in a region F of FIG. 5, the supplying of the electric power to the motor 70 is started while the solenoid valve 56 is maintained in a closed state, and thus the hydraulic pressure on the upstream side is increased. When the hydraulic pressure on the upstream side exceeds the hydraulic pressure on the downstream side, this hydraulic pressure is supplied (recharged) to the downstream side via the bypass oil passage 55 and the one-way valve 55v. When the hydraulic pressure on the downstream side becomes the upper limit holding hydraulic pressure HP, the supplying of the electric power to the motor 70 is stopped, and thus the generation of the hydraulic pressure is stopped. Thus, the hydraulic pressure on the downstream side is maintained between the upper limit holding hydraulic pressure HP and the lower limit holding hydraulic pressure LP, and the clutch 26 is maintained in the engaged state.

When the motorcycle 1 is stopped, the supplying of the electric power to both the motor 70 and the solenoid valve 56 is stopped. Therefore, the master cylinder 60 stops the generation of the hydraulic pressure and stops the supply of the hydraulic pressure to the slave cylinder 28. The solenoid valve 56 enters an open state, and the hydraulic pressure in the downstream oil passage 54*b* is returned to the reserve tank 75. Accordingly, the slave cylinder 28 side (the downstream side) enters a low pressure state lower than the touch point hydraulic pressure TP, and the clutch 26 enters the non-engaged state. This state corresponds to regions G and H in FIG. 5.

<Clutch Locking Mechanism>

Next, the clutch locking mechanism 80 of the embodiment will be described with reference to FIGS. 6 to 11.

Figure 6:
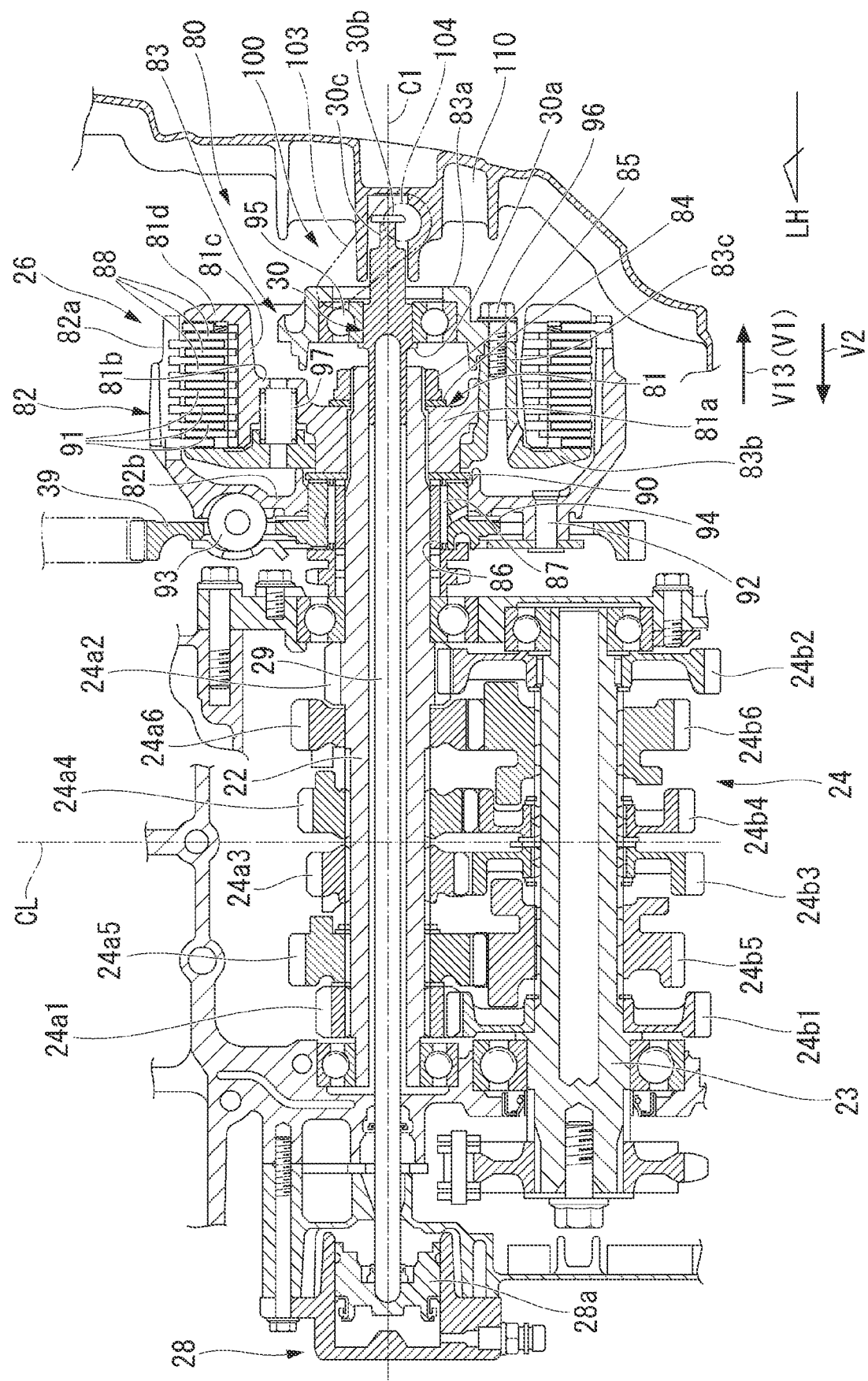
FIG. 6 is a cross-sectional view of a clutch locking mechanism of the embodiment.
Figure 7:
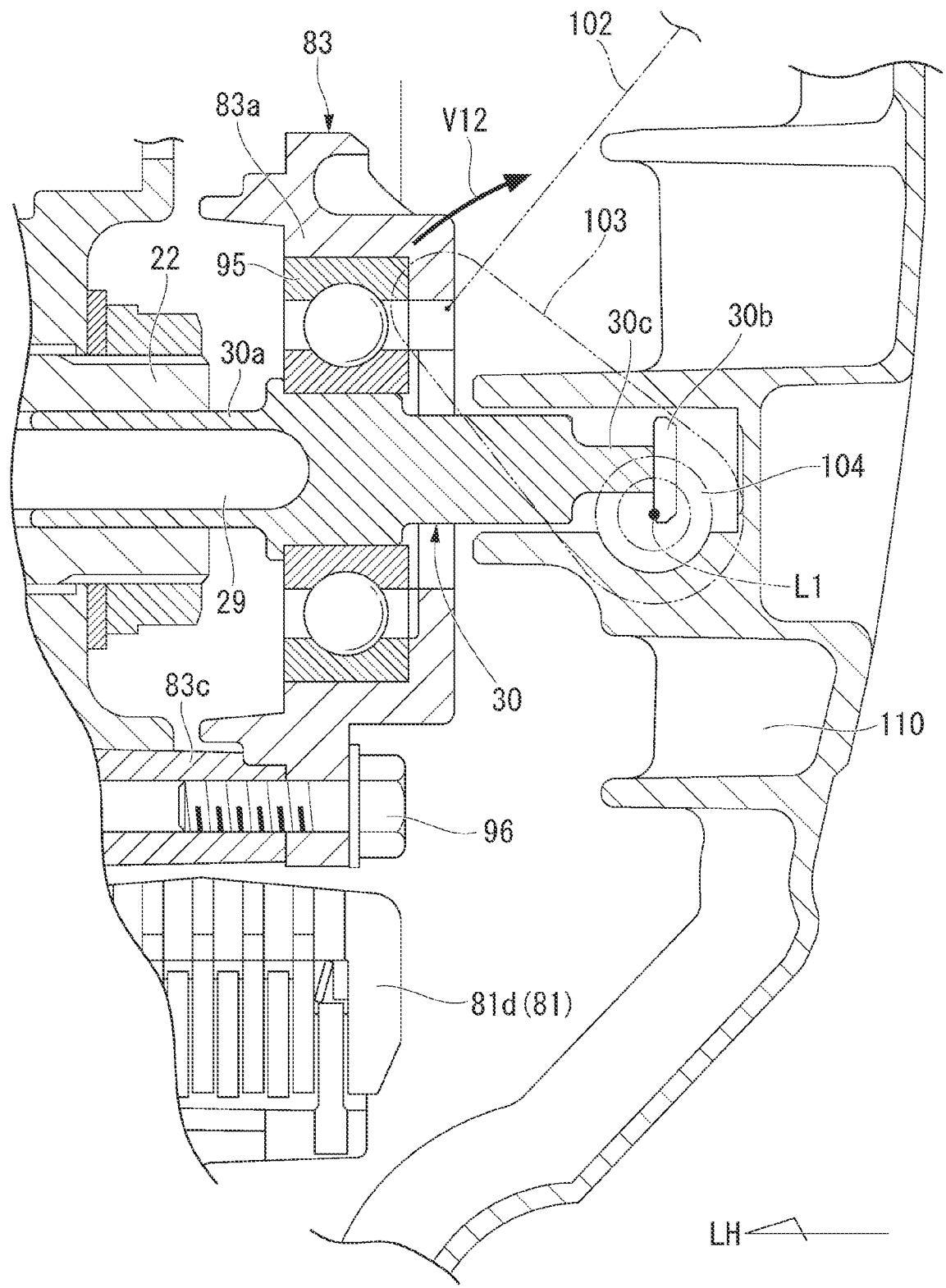
FIG. 7 is an enlarged view of a main part of FIG. 6.

As shown in FIG. 6, the clutch locking mechanism 80 includes the clutch 26 and a locking mechanism 100 which can lock the clutch 26. The clutch 26 is a normally-open clutch which enters the engaged state where power can be transmitted when the slave cylinder 28 (the actuator) is operated, and returns to the disengaged state where power cannot be transmitted when the slave cylinder 28 is not operated.

<Clutch>

The clutch 26 includes a clutch center 81 which is connected to the main shaft 22, a clutch outer 82 which is provided outside the clutch center 81, the push rod 29 which movable along the main shaft 22, and a pressure plate 83 which is connected to the push rod 29 and can connect the clutch center 81 to the clutch outer 82.

The main shaft 22 is formed in a hollow shape. A reference numeral Cl in the drawing indicates a central axis of the main shaft 22 (hereinafter, referred to as a "main axis").

Drive gears 24*a*1 to 24*a*6 for sixth gear in the transmission gear group 24 are distributed and disposed on the outer circumference of the main shaft 22. Driven gears 24*b*1 to 24*b*6 for sixth gear in the transmission gear group 24 are distributed and disposed on the outer circumference of the counter shaft 23. The drive gears 24*a*1 to 24*a*6 and the driven gears 24*b*1 to 24*b*6 respectively engage with each other in each of shift stages to form transmission gear pairs corresponding to each of the shift stages. For each of transmission gear pairs, a reduction ratio decreases in order of first gear to sixth gear (high-speed gears are formed).

Each of the clutch center 81 and the clutch outer 82 is disposed coaxially with the main shaft 22. The clutch center 81 includes a central tubular portion 81*a* which has a tubular shape and is located at a central portion (an inner portion in the radial direction) of the clutch center 81, an extension portion 81*b* which extends outward from the central tubular portion 81*a* (toward an outer wall portion 82*a* of the clutch outer 82), a disc support portion 81*c* which has a cylindrical shape and is connected to an outer end portion of the extension portion 81*b*, and a stopper portion 81*d* which is connected to a right end portion of the disc support portion 81*c*.

For example, the central tubular portion 81*a* is splinefitted into the main shaft 22. The central tubular portion 81*a* is fixed to a right end portion of the main shaft 22 by a lock nut 85 via a washer 84.

An annular collar 86 and the like centered on the main axis Cl are provided on the main shaft 22. A primary driven gear 39 is supported on the main shaft 22 via the collar 86 and a needle bearing 87 to be relatively rotatable.

A plurality of clutch discs 88 are supported on the outer circumference of the disc support portion 81*c*. A reference numeral 90 in the drawing indicates a washer provided between the central tubular portion 81*a* of the clutch center 81 and the collar 86.

The clutch outer 82 has a bottomed cylindrical shape which accommodates the clutch center 81. The clutch outer 82 includes an outer wall portion 82*a* located on an outer peripheral portion of the clutch outer 82, and a bottom portion 82*b* connected to a left end portion of the outer wall portion 82*a*. A plurality of clutch plates 91 are supported on the inner circumference of the outer wall portion 82*a* of the clutch outer 82.

The bottom portion 82*b* of the clutch outer 82 is connected to the primary driven gear 39 via a rivet 92. The clutch outer 82 rotates integrally with the crankshaft 14 as the crankshaft 14 (refer to FIG. 1) rotates.

A reference numeral 93 in the drawing indicates a coil spring (a first dumper) which is interposed between the primary driven gear 39 and the bottom portion 82*b* of the clutch outer 82 in a rotation direction of the primary driven gear 39 and can absorb an impact or the like generated in a rotation direction of the main shaft 22, and a reference numeral 94 indicates a disc spring (a second damper) which is interposed between the primary driven gear 39 and the bottom portion 82*b* of the clutch outer 82 in a direction of the main axis (the vehicle width direction) and can absorb an impact or the like generated in the direction of the main axis.

The push rod 29 is inserted through the main shaft 22. In the embodiment, the slave cylinder 28 is provided on the left side of the vehicle. A reference numeral 28*a* in the drawing indicates a slave-side piston constituting the slave cylinder 28. The slave-side piston 28*a* presses the push rod 29 passing through the main shaft 22 to the right when the hydraulic pressure is supplied from the clutch actuator 50 (refer to FIG. 3).

A lifter pin 30 is connected to a right end portion of the push rod 29. Part of the lifter pin 30 is inserted through the right end portion of the main shaft 22. The lifter pin 30 moves in conjunction with movement of the push rod 29. The engagement and disengagement of the clutch 26 is switched according to advance and retreat movement of the lifter pin 30 with respect to the main shaft 22.

The lifter pin 30 includes a base portion 30*a* to which the push rod 29 is connected, a head portion 30*b* with which a clutch operating rod is engaged, and a shaft portion 30*c* which connects the base portion 30*a* to the head portion 30*b*. The head portion 30*b* has a disk shape having a diameter larger than that of the shaft portion 30*c*.

The pressure plate 83 is connected to the push rod 29 via the lifter pin 30. The pressure plate 83 is supported by the lifter pin 30 via a bearing 95 to be relatively rotatable. The pressure plate 83 includes a bearing support portion 83*a* which supports the bearing 95, a pressure portion 83*b* which faces the stopper portion 81*d* of the clutch center 81 in the direction of the main axis, and a protruding portion 83*c* which protrudes to the right from part of the pressure portion 83*b*. A central portion of the pressure portion 83*b* is open in the direction of the main axis so that the central tubular portion 81*a* of the clutch center 81 can be inserted therethrough. A reference numeral 96 in the drawing indicates a bolt for fixing the bearing support portion 83*a* to the protruding portion 83*c*.

Each of the clutch plates 91 and each of the clutch discs 88 are disposed between the stopper portion 81d of the clutch center 81 and the pressure portion 83b of the pressure plate 83.

Each of the clutch plates 91 and each of the clutch discs 88 are alternately arranged and disposed in the direction of the main axis. A spring 97 is disposed between the extension portion 81b of the clutch center 81 and the pressure portion 83b of the pressure plate 83. The spring 97 constantly biases the pressure plate 83 to the left (in a direction in which the pressure portion 83b is separated from the extension portion 81b).

The clutch 26 enters the disengaged state when the pressure plate 83 is separated from the clutch center 81 by an urging force of the spring 97. On the other hand, the clutch 26 enters the engaged state when the pressure plate 83 is pressed against the urging force of the spring 97.

<Locking Mechanism>

The locking mechanism 100 includes an operator 101 (refer to FIG. 11) which can bring the clutch 26 into the engaged state separately from the operation of the slave cylinder 28, a wire 102 (refer to FIG. 7) which is connected to the operator 101, an arm 103 which is connected to the wire 102 and is rotatable, and a clutch operating rod 104 which rotates in conjunction with rotation of the arm 103. Part of the locking mechanism 100 is provided on the side opposite to the slave cylinder 28 in the vehicle width direction. In the embodiment, the arm 103 and the clutch operating rod 104 constituting the locking mechanism 100 are provided on the right side of the vehicle.

The locking mechanism 100 operates the pressure plate 83 in an engagement direction V1 (a right direction) by operating the operator 101. Here, the engagement direction V1 means the direction in which the clutch 26 changes from the disengaged state to the engaged state. In the embodiment, the engagement direction V1 is a direction (the right direction) in which the pressure plate 83 (the pressure portion 83b) is engaged with the clutch center 81 from a state in which the pressure plate 83 (the pressure portion 83b) is separated from the clutch center 81 (the extension portion 81b). The locking mechanism 100 operates the pressure plate 83 in the engagement direction V1 by rotating the clutch operating rod 104.

Figure 11:
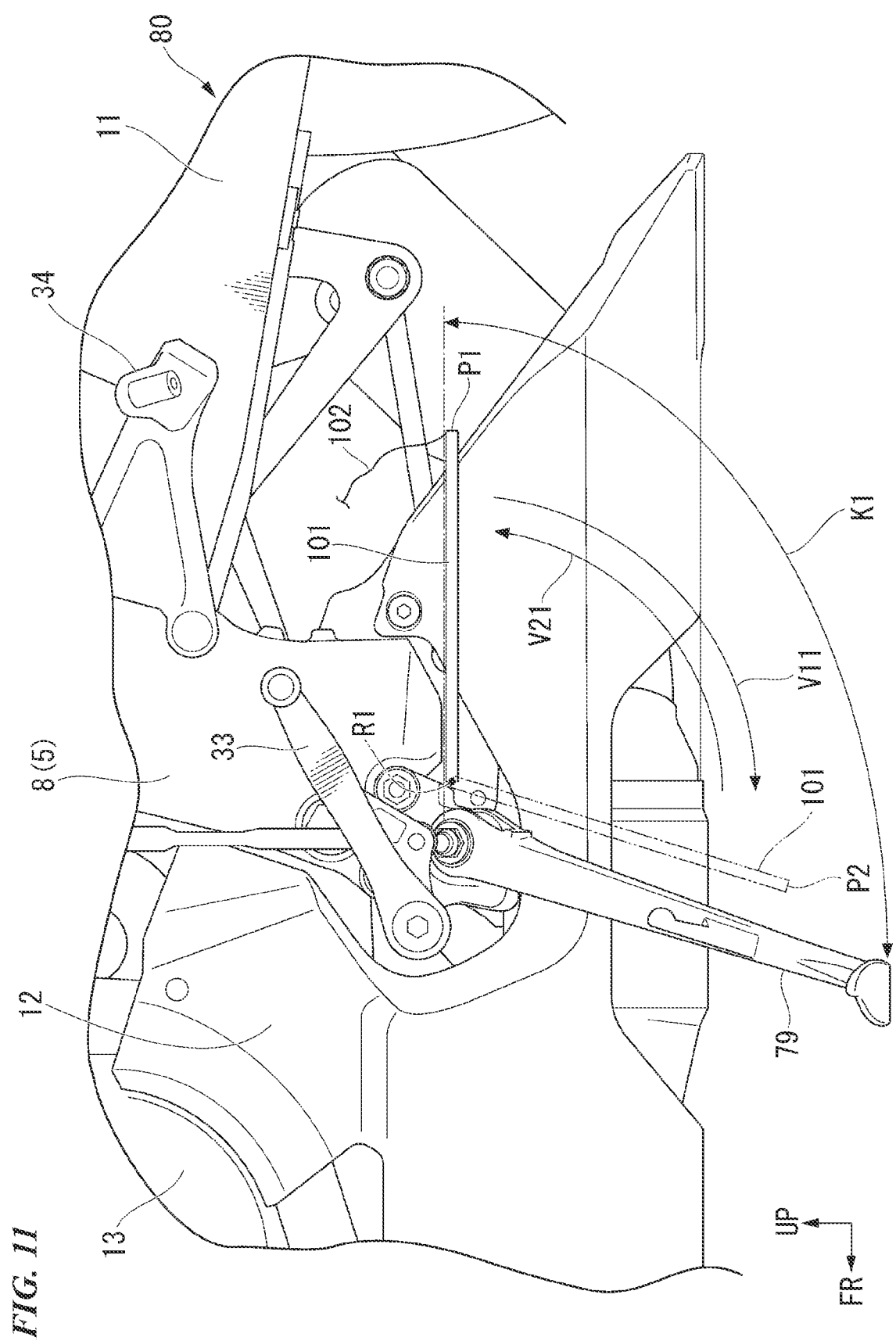
FIG. 11 is an operation explanatory view of an operator of the embodiment.

As shown in FIG. 11, the operator 101 is provided on the left side of the vehicle. The operator 101 is disposed behind the stand 79. For example, the operator 101 is a lever which can be operated by the driver (the occupant) with his/her foot. The operator 101 is rotatable around an axis R1 which follows the vehicle width direction. A rotation range of the operator 101 is within a rotation locus K1 of the stand 79.

The operator 101 extends in a forward and rearward direction at an initial position P1. Here, the initial position P1 means a position before the operation of the operator 101 (a position in the released state). When the operator 101 is in the initial position P1, the clutch 26 enters the disengaged state (hereinafter, also referred to as a "clutch open state").

The operator 101 extends along the stand 79 at an operating position P2 (a position indicated by a two-dot chain line in FIG. 11). Here, the operating position P2 means a position after the operation of the operator 101 (a position in an operating state). When the operator 101 is in the operating position P2, the clutch 26 enters the engaged state (hereinafter, also referred to as a "clutch lock state").

The operator 101 can be operated only when the stand 79 is in use. The operator 101 can be operated only when the stand 79 is lowered. The operator 101 can be operated when the vehicle is stopped and the stand 79 is pulled out. When the stand 79 is pulled out in an in-gear state while the engine is being operated, the engine will stop, and thus the clutch will not be locked during traveling or the like.

The operator 101 returns to the initial position P1 with an operation in which the stand 79 is retracted. For example, the operator 101 is provided to overlap at least part of the stand 79 in a process in which the stand 79 is retracted when the operator 101 is in the operating position P2. For example, the operator 101 may include a contact portion (not shown) which comes into contact with part of the stand 79 in the process in which the stand 79 is retracted.

One end of the wire 102 is connected to a tip end portion (an end portion on the side opposite to a rotating portion) of the operator 101. Although not shown, an urging member which constantly urges the operator 101 to the operating position and a holding member which holds the operator 101 at the initial position P1 against the urging force of the urging member are provided on the left side of the vehicle. The operator 101 may be held at the initial position P1 by the stand 79 when the stand 79 is not in use (when the stand is in a state before use).

The wire 102 is a wire rod which transmits the operation of the operator 101 to the arm 103. The wire 102 is constantly urged in a clutch lock release direction V2 (a direction opposite to the engagement direction V1 of the clutch 26, refer to FIG. 6) by an urging member (not shown) such as a spring.

Next, wiring of the wire 102 will be described.

Figure 12:
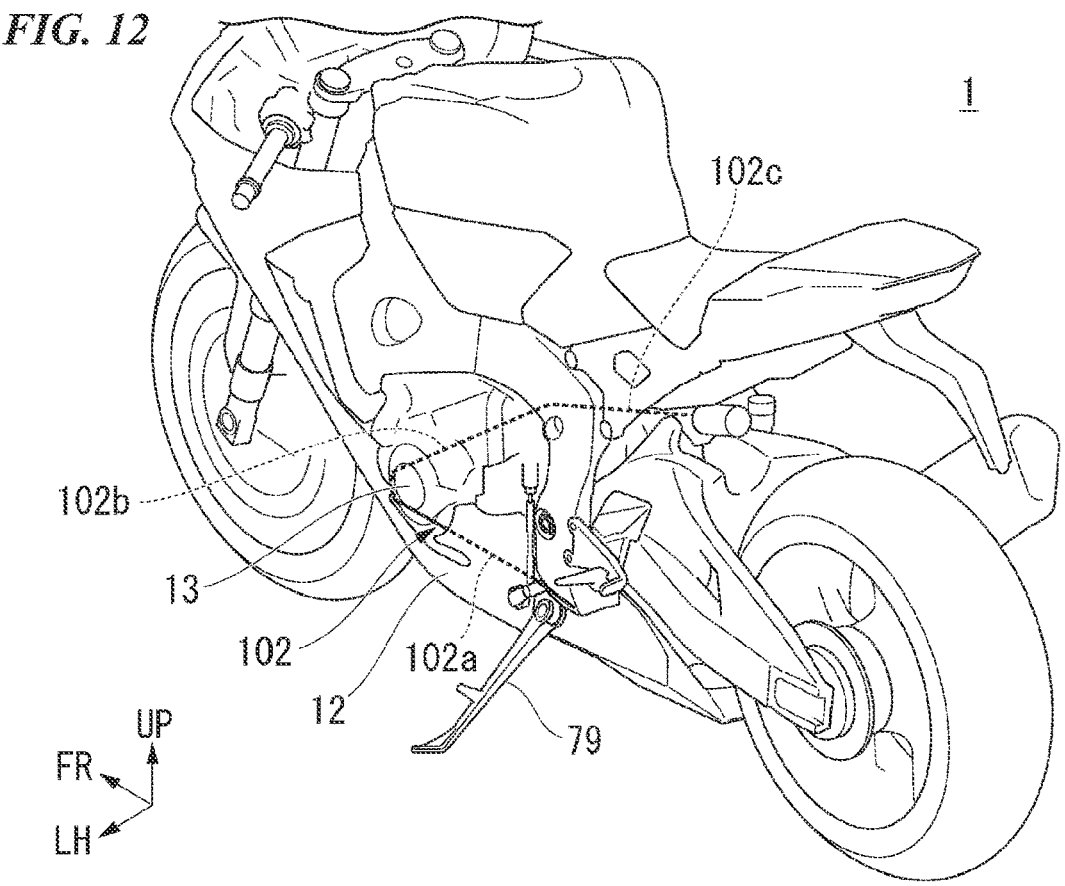
FIG. 12 is a perspective view of a left portion of the vehicle for explaining wiring of wires according to the embodiment.
Figure 13:
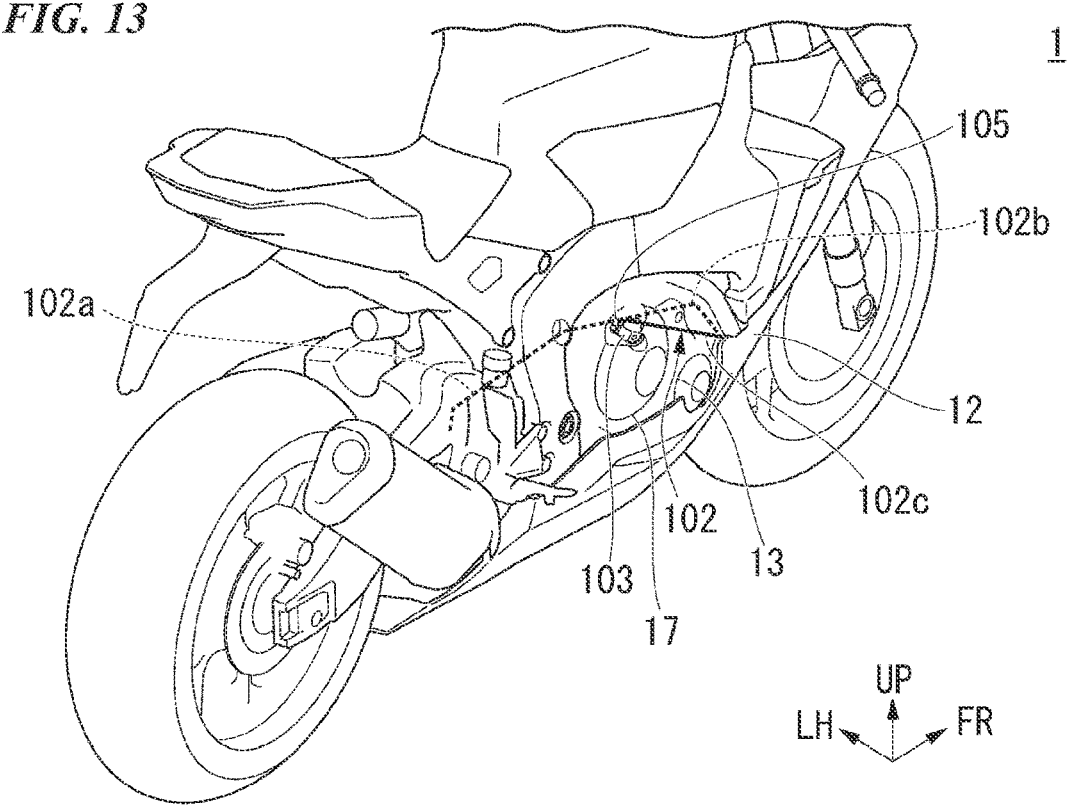
FIG. 13 is a perspective view of a right portion of the vehicle for explaining the wiring of wires according to the embodiment.

As shown in FIG. 12, the wire 102 is arranged in front of the engine 13. The wire 102 includes a front extending portion 102a which extends forward from an end portion of the operator 101 (refer to FIG. 11), a vehicle width direction extending portion 102b which extends forward of the engine 13 from a front end portion of the front extending portion 102a in the vehicle width direction, and a rear extending portion 102c which extends rearward from a right end portion of the vehicle width direction extending portion 102b toward a connecting member 105 (refer to FIG. 13). Part of the front extending portion 102a is arranged inside in the vehicle width direction with respect to part of the vehicle body cover 12 (for example, a left under cowl). Although not shown, a holding portion for holding an intermediate portion (for example, a bent portion) of the wire 102 is provided in the vehicle body.

However, when the wire 102 is routed and the number of bending points of the wire 102 is more than a threshold value, friction with the holding portion of the wire 102 or the like increases, and it becomes difficult to smoothly transmit the operation of the operator 101 to the arm 103. Therefore, when the wire 102 is routed, preferably, the number of bending points of the wire 102 is less than the threshold value.

Figure 8:
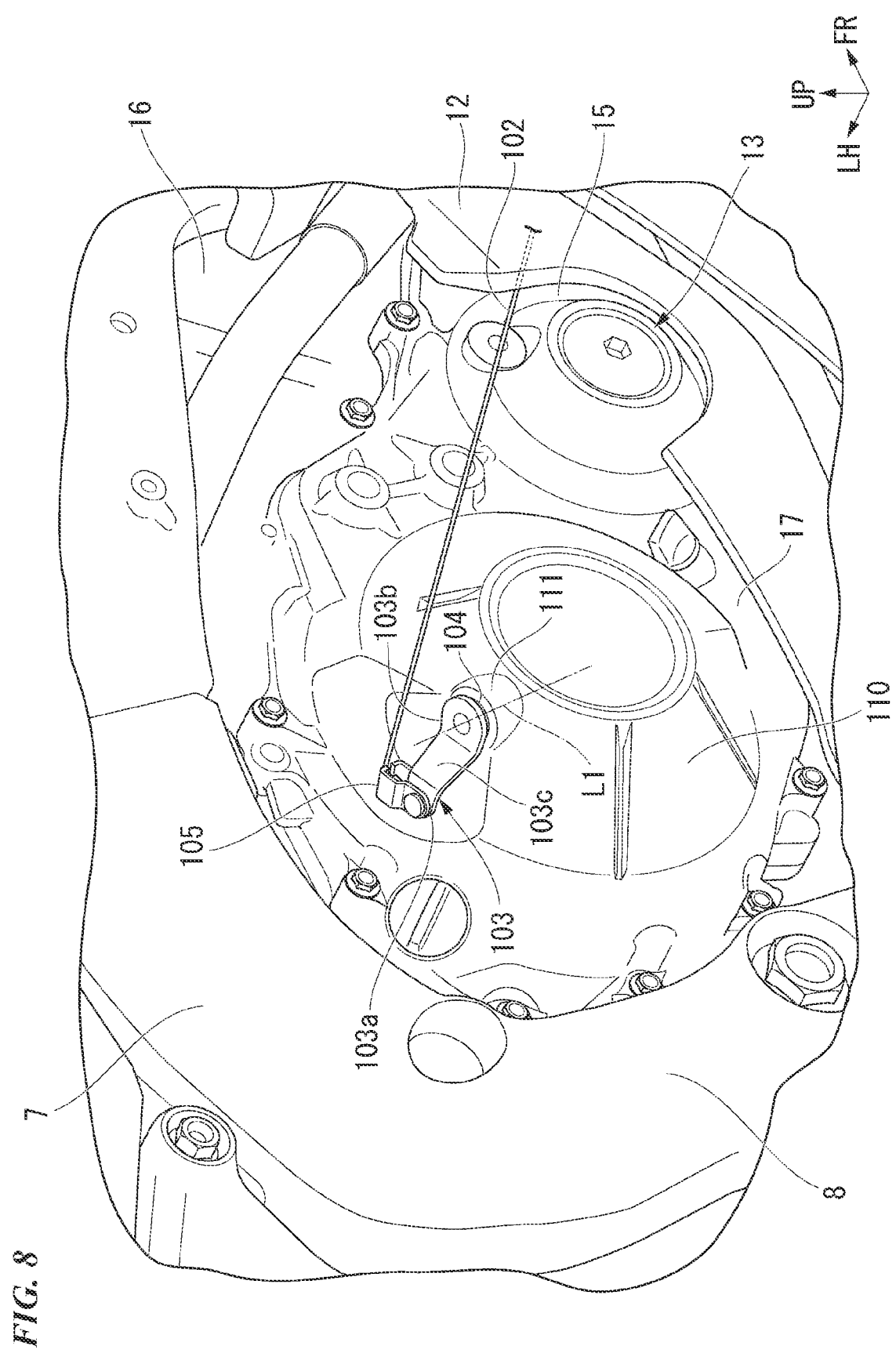
FIG. 8 is a perspective view of a locking mechanism on the right side of the motorcycle of the embodiment.

As shown in FIG. 8, the arm 103 is supported on the right side of the transmission case 17. A reference numeral 110 in the drawing indicates a clutch cover which is provided on the right side of the transmission case 17 and covers the clutch 26 (refer to FIG. 6) from the right side. The clutch cover 110 has a support convex portion 111 which protrudes rearward and upward to support the arm 103. The support convex portion 111 is opened rearward and upward so that the clutch operating rod 104 (refer to FIG. 6) can be inserted therethrough. The arm 103 is rotatable around an opening axis L1 of the support convex portion 111. The arm 103 is a plate material having a crank-shaped cross section (refer to FIG. 10). In the drawing, a reference numeral 105 indicates a connecting member to which the other end of the wire 102 is connected.

The arm 103 includes a first mounting portion 103*a* on which the connecting member 105 is mounted, a second mounting portion 103*b* on which the clutch operating rod 104 is mounted, and a connecting portion 103*c* which connects the first mounting portion 103*a* to the second mounting portion 103*b*.

Figure 9:
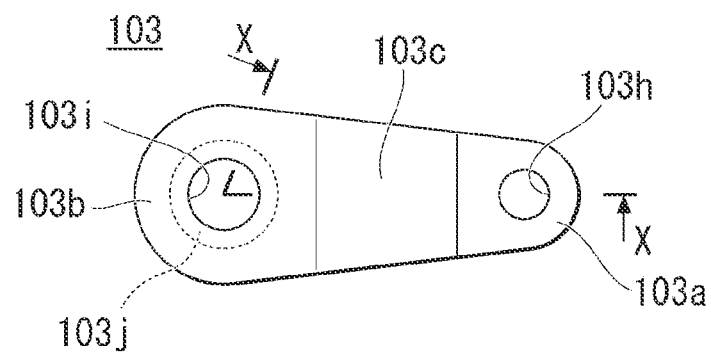
FIG. 9 is a plan view of an arm of the embodiment.

As shown in FIG. 9, the arm 103 has a through hole 103*h* which passes through the first mounting portion 103*a*, a hole portion 103*i* which is provided in the second mounting portion 103*b*, and a convex portion 103*j* which is provided in the second mounting portion 103*b* on the side opposite to the hole portion 103*i*. The first mounting portion 103*a*, the second mounting portion 103*b*, and the connecting portion 103*c* are integrally formed of the same member. In a plan view, a width of the arm 103 gradually increases from the first mounting portion 103*a* toward the second mounting portion 103*b*.

As shown in FIG. 8, the clutch operating rod 104 is inserted through the opening of the support convex portion 111. The clutch operating rod 104 rotates around the opening axis L1 of the support convex portion 111 in conjunction with the arm 103. The clutch operating rod 104 extends along the opening axis L1 of the support convex portion 111.

Figure 10:
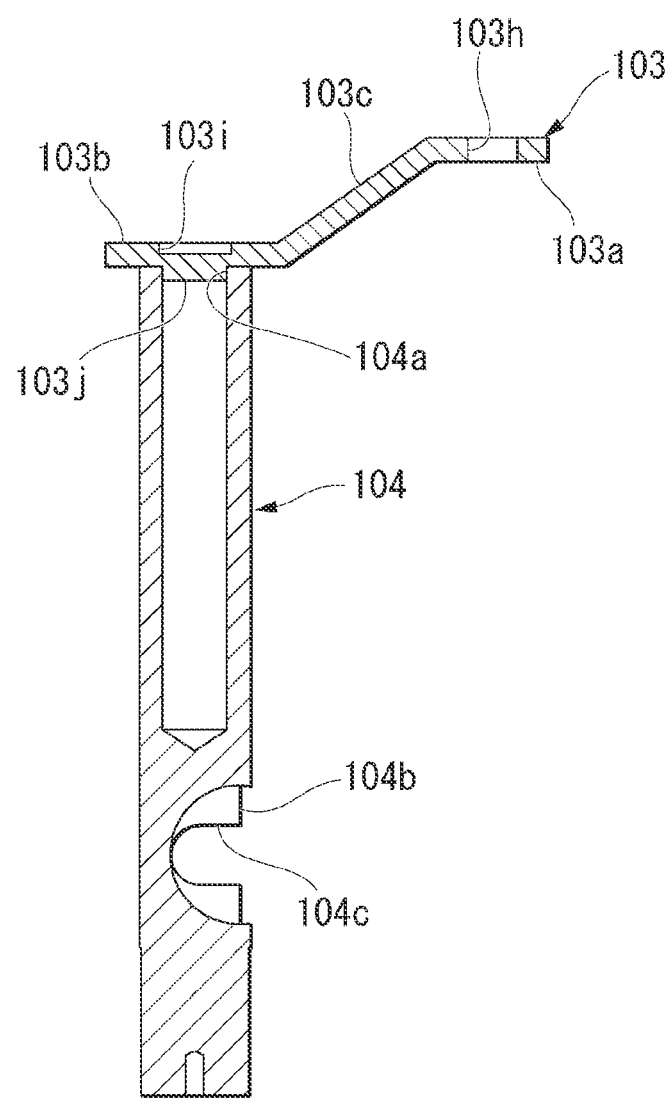
FIG. 10 is a cross-sectional view of a clutch operating rod of the embodiment including a cross section of FIG. 9 taken along line X-X.

As shown in FIG. 10, the clutch operating rod 104 includes a fitting concave portion 104*a* into which the convex portion 103*j* of the arm 103 is fitted, an engaging concave portion 104*b* which engages with the head portion 30*b* (refer to FIG. 7) of the lifter pin 30, and an insertion concave portion 104*c* through which the shaft portion 30*c* (refer to FIG. 7) of the lifter pin 30 is inserted. For example, the arm 103 and the clutch operating rod 104 are welded together in a state in which the convex portion 103*j* of the arm 103 is fitted into the fitting concave portion 104*a* of the clutch operating rod 104. In a cross-sectional view, the engaging concave portion 104*b* has an arc shape along an outer shape of the head portion 30*b* of the lifter pin 30.

Next, an operation of the locking mechanism 100 will be described.

The clutch lock state can be set by operating the operator 101 in the clutch open state. Specifically, after the stand 79 is pulled out when the vehicle is stopped, the operator 101 is rotated from the initial position P1 toward the operating position P2 (in a direction of arrow V11 in FIG. 11). Then, the wire 102 is pulled in conjunction with the rotation of the operator 101, and the arm 103 rotates around the opening axis L1 of the support convex portion 111 (in a direction of arrow V12 in FIG. 7). Then, the clutch operating rod 104 rotates in conjunction with the rotation of the arm 103. Then, the lifter pin 30 moves to the right by engaging with the clutch operating rod 104 (in a direction of arrow V13 in FIG. 6). Then, the push rod 29 moves to the right in conjunction with the movement of the lifter pin 30. Thus, the pressure plate 83 is operated in the engagement direction V1, and the clutch lock state is set. The operator 101 is held at the operating position P2 by an urging force of the urging member (not shown).

On the other hand, the clutch open state can be set by operating the operator 101 in the clutch lock state. Specifically, when the vehicle is stopped, the operator 101 is rotated from the operating position P2 toward the initial position P1 (in a direction of arrow V21 in FIG. 11). For example, the operator 101 is returned to the initial position P1 with the operation in which the stand 79 is retracted. Then, the wire 102 is pulled in the clutch lock release direction V2 (refer to FIG. 6) by the urging member (not shown) such as a spring, and the clutch open state is set. The operator 101 is held at the initial position P1 by a holding member (not shown). The stand 79 itself may serve as the operator. That is, one end of the wire 102 may be connected to a tip end portion of the stand 79.

As described above, the clutch locking mechanism 80 of the above-described embodiment is a clutch locking mechanism 80 mounted in the motorcycle 1 and includes the clutch 26 which enters the engaged state where power can be transmitted when the slave cylinder 28 is operated and returns to the disengaged state where power cannot be transmitted when the slave cylinder 28 is not operated, and the locking mechanism 100 having the operator 101 capable of bringing the clutch 26 into the engaged state separately from the operation of the slave cylinder 28.

With such a configuration, the following effects can be obtained by providing the locking mechanism 100 having the operator 101 capable of bringing the clutch 26 into the engaged state separately from the operation of the slave cylinder 28.

When the vehicle is stopped on a sloping road or the like, the clutch 26 can be forcibly set into the engaged state by an operation of the operator 101, and thus the vehicle can be prevented from sliding down. In addition, since it is not necessary to mount a parking brake system, it is possible to curb an increase in cost and weight. Therefore, it is possible to prevent the vehicle from sliding down a sloping road or the like while the increase in cost and weight is curbed.

In the above-described embodiment, the clutch 26 has the clutch center 81 connected to the main shaft 22, the clutch outer 82 provided outside the clutch center 81, the push rod 29 which is movable along the main shaft 22, and the pressure plate 83 which is connected to the push rod 29 and can connect the clutch center 81 to the clutch outer 82. The locking mechanism 100 operates the pressure plate 83 in the engagement direction V1 by the operation of the operator 101. With such a configuration, the following effects can be obtained.

Since the existing parts such as the pressure plate 83 can be used, it is possible to curb an increase in the number of parts and an increase in weight.

In the above-described embodiment, the locking mechanism 100 includes the wire 102 connected to the operator 101, the arm 103 connected to the wire 102 and is rotatable, and the clutch operating rod 104 which rotates in conjunction with the rotation of the arm 103. The locking mechanism 100 operates the pressure plate 83 in the engagement direction V1 by rotating the clutch operating rod 104. With such a configuration, the following effects are obtained.

Since the operator 101 and the pressure plate 83 are mechanically connected, the clutch 26 can be set into the engaged state without consuming electric power or the like. Therefore, the configuration can be inexpensive.

In the above-described embodiment, the slave cylinder 28 is provided on the left side of the vehicle, and part of the locking mechanism 100 is provided on the right side of the vehicle, thereby achieving the following effects.

Since the slave cylinder 28 and the locking mechanism 100 are disposed separately in the vehicle width direction, it is possible to curb an increase in size to one side in the vehicle width direction. In addition, an influence on a bank angle and the like can be curbed.

In the above-described embodiment, the stand 79 capable of standing the motorcycle 1 is further provided, and the operator 101 can be operated only when the stand 79 is in use, thereby achieving the following effects.

It is possible to curb an erroneous operation of the operator 101 when the vehicle is not stopped.

Therefore, it is possible to curb an unintentional engaged state of the clutch 26 when the vehicle is not stopped.

In the above-described embodiment, the operator 101 returns to the initial position P1 together with the operation in which the stand 79 is retracted, thereby achieving the following effects.

Since the engaged state of the clutch 26 is released by the operator 101 due to the operation in which the stand 79 is retracted, it is possible to curb forgetting to release the engaged state of the clutch 26.

<Modified Example>

In the above-described embodiment, although the example in which the actuator is the slave cylinder 28 (the example in which the clutch 26 is operated in the engaged state via the push rod 29 by the slave cylinder 28 pressing the push rod 29 to the right when the hydraulic pressure is supplied from the clutch actuator 50) has been described, the present invention is not limited thereto. For example, the actuator may be other than the slave cylinder 28 (a configuration in which the clutch 26 is operated in the engaged state by other than the hydraulic pressure). That is, the clutch 26 may be a normally-open clutch which enters the engaged state where power can be transmitted when the actuator is operated and returns to the disengaged state in which the power cannot be transmitted when the actuator is not operated.

In the above-described embodiment, although the example in which the clutch 26 includes the push rod 29 has been described, the present invention is not limited thereto. For example, the clutch 26 does not have to include the push rod 29. For example, the clutch 26 may be driven directly by the motor 70. That is, the clutch 26 may include the clutch center 81, the clutch outer 82, and the pressure plate 83 which is moved by the actuator (the slave cylinder 28) and can connect the clutch center 81 to the clutch outer 82.

In the above-described embodiment, although the example in which the operator 101 is disposed behind the stand 79 has been described, the present invention is not limited thereto. For example, the operator 101 may be disposed around the handle 2. Preferably, the operator 101 is disposed in a place in which the occupant can easily operate the operator 101.

In the above-described embodiment, although the example in which the slave cylinder 28 is provided on the left side of the vehicle and part of the locking mechanism 100 is provided on the right side of the vehicle has been described, the present invention is not limited thereto. For example, the slave cylinder 28 may be provided on the right side of the vehicle, and part of the locking mechanism 100 may be provided on the left side of the vehicle. For example, the slave cylinder 28 may be provided on one side of the motorcycle 1 in the vehicle width direction, and at least part of the locking mechanism 100 may be provided on the side opposite to the slave cylinder 28 in the vehicle width direction.

In the above-described embodiment, although the example in which part of the locking mechanism 100 is provided on the side opposite to the slave cylinder 28 in the vehicle width direction has been described, the present invention is not limited thereto. For example, the entire locking mechanism 100 may be provided on the side opposite to the slave cylinder 28 in the vehicle width direction. Accordingly, it is possible to more effectively curb the increase in size to one side in the vehicle width direction.

In the above-described embodiment, although the example in which the operator 101 can be operated only when the stand 79 is in use has been described, the present invention is not limited thereto. For example, the operator 101 may be operable when the stand 79 is not in use.

In the above-described embodiment, although the example in which the operator 101 returns to the initial position P1 together with the operation in which the stand 79 is retracted has been described, the present invention is not limited thereto. For example, the operator 101 may return to the initial position P1 separately from the operation in which the stand 79 is retracted.

In the above-described embodiment, although the example in which the wire 102 is arranged in front of the engine 13 has been described, the present invention is not limited thereto. For example, the wire may be arranged along the vehicle body frame 5. For example, the wire may be routed to bypass the engine 13. For example, the routing of the wire is appropriately selected according to the vehicle body structure, such as bypassing the front, rear, and upper sides of the engine 13.

Figure 14:
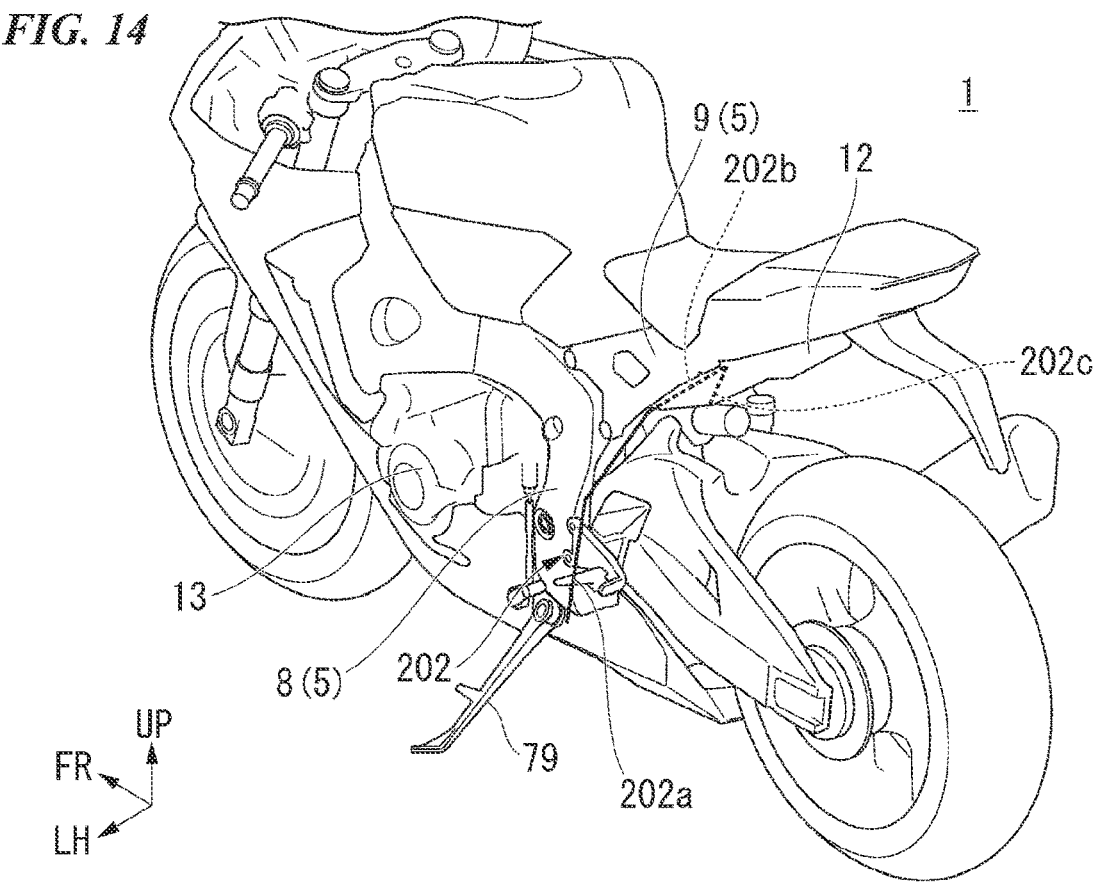
FIG. 14 is a perspective view of the left portion of the vehicle for explaining the wiring of wires according to a first modified example of the embodiment.
Figure 15:
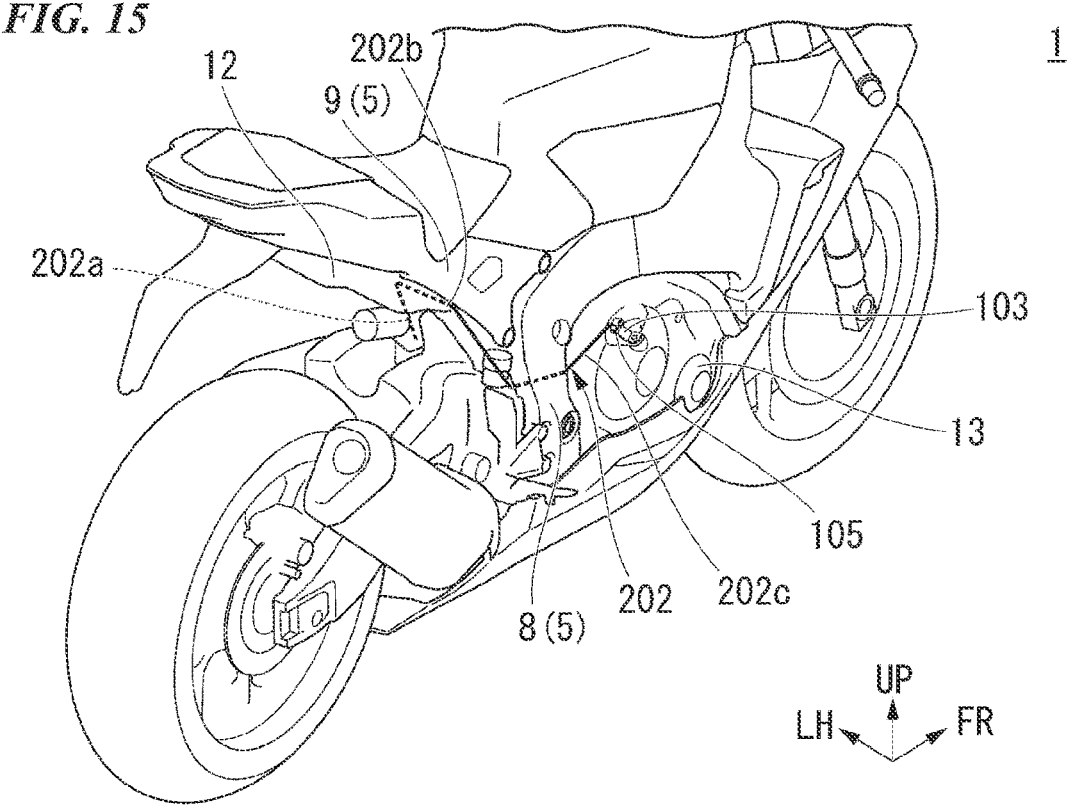
FIG. 15 is a perspective view of the right portion of the vehicle for explaining the wiring of wires according to the first modified example of the embodiment.

For example, as shown in FIG. 14, a wire 202 may be arranged below the seat rail 9. The wire 202 includes an upper extending portion 202a which extends upward from an end portion of the operator 101 (refer to FIG. 11) behind the pivot frame 8, a vehicle width direction extending portion 202b which extends below the seat rail 9 from an upper end portion of the upper extending portion 202a in the vehicle width direction, and a front extending portion 202c which extends forward from a right end portion of the vehicle width direction extending portion 202b toward the connecting member 105 (refer to FIG. 15). Part of the vehicle width direction extending portion 202b is arranged above part of the vehicle body cover 12 (for example, a cover under the seat rail). Part of the front extending portion 202c is arranged inward with respect to the pivot frame 8 in the vehicle width direction. Although not shown, a holding portion for holding an intermediate portion (for example, a bent portion) of the wire 202 is provided in the vehicle body.

Figure 16:
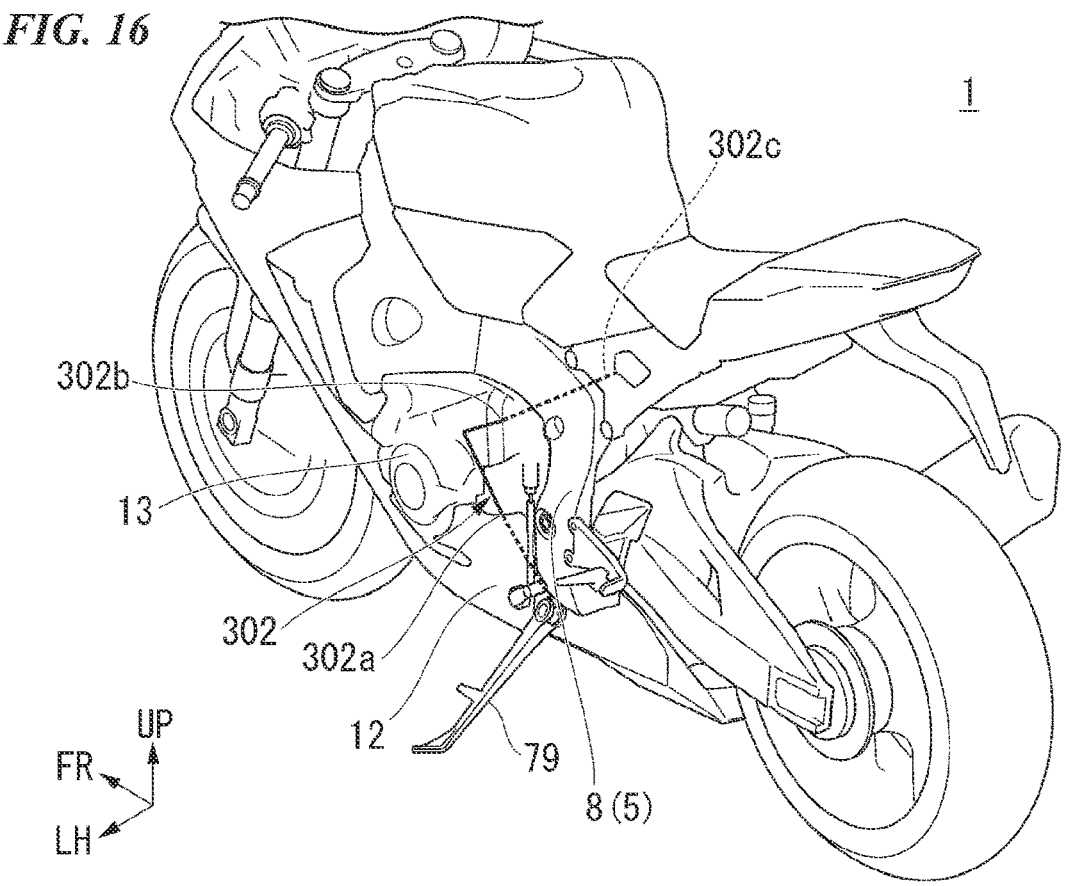
FIG. 16 is a perspective view of the left portion of the vehicle for explaining the wiring of wires according to a second modified example of the embodiment.
Figure 17:
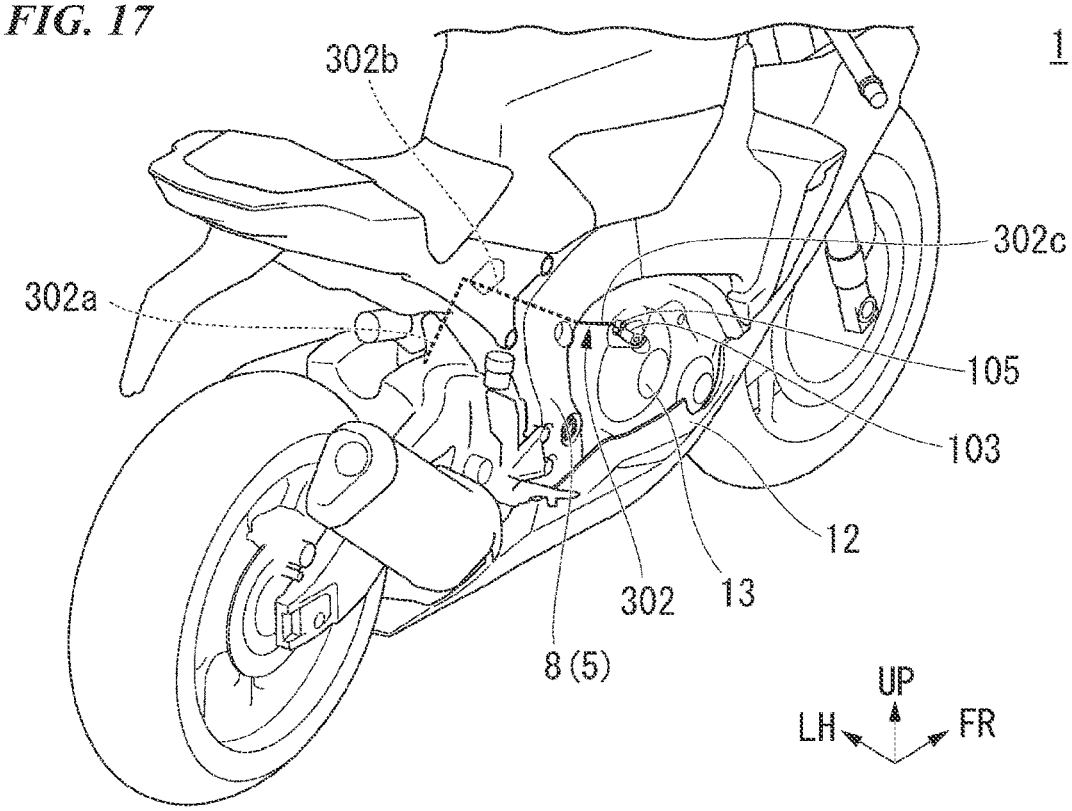
FIG. 17 is a perspective view of the right portion of the vehicle for explaining the wiring of wires according to a second modified example of the embodiment.
Figure 18:
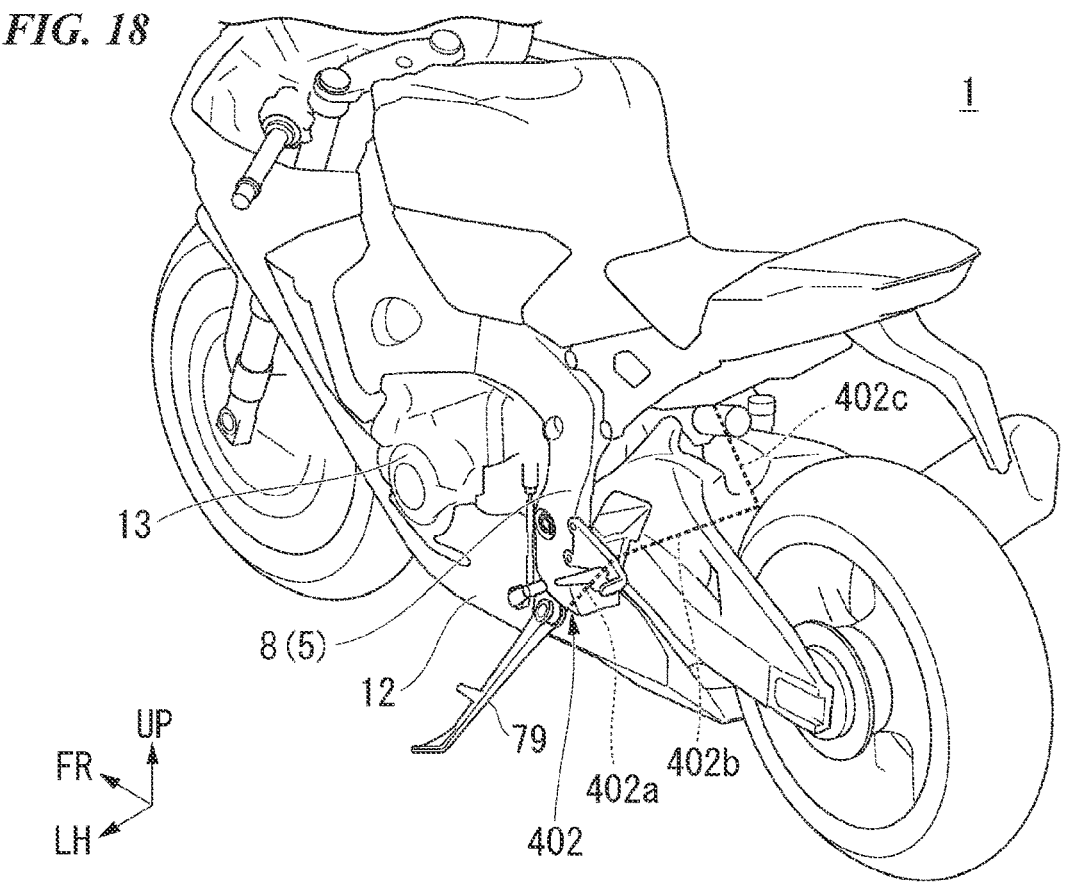
FIG. 18 is a perspective view of the left portion of the vehicle for explaining the wiring of wires according to a third modified example of the embodiment.

For example, as shown in FIG. 16, a wire 302 may be arranged behind the engine 13. The wire 302 includes an upper extending portion 302a which extends upward from an end portion of the operator 101 (refer to FIG. 11) in front of the pivot frame 8, a vehicle width direction extending portion 302b which extends from the upper end portion of the upper extending portion 302a behind the engine 13 in the vehicle width direction, and a front extending portion 302c which extends forward from a right end portion of the vehicle width direction extending portion 302b toward the connecting member 105 (refer to FIG. 17). Part of the upper extending portion 302a is arranged inward with respect to part of the vehicle body cover 12 (for example, a left under cowl) in the vehicle width direction. Although not shown, a holding portion for holding an intermediate portion (for example, a bent portion) of the wire 302 is provided in the vehicle body.

Figure 19:
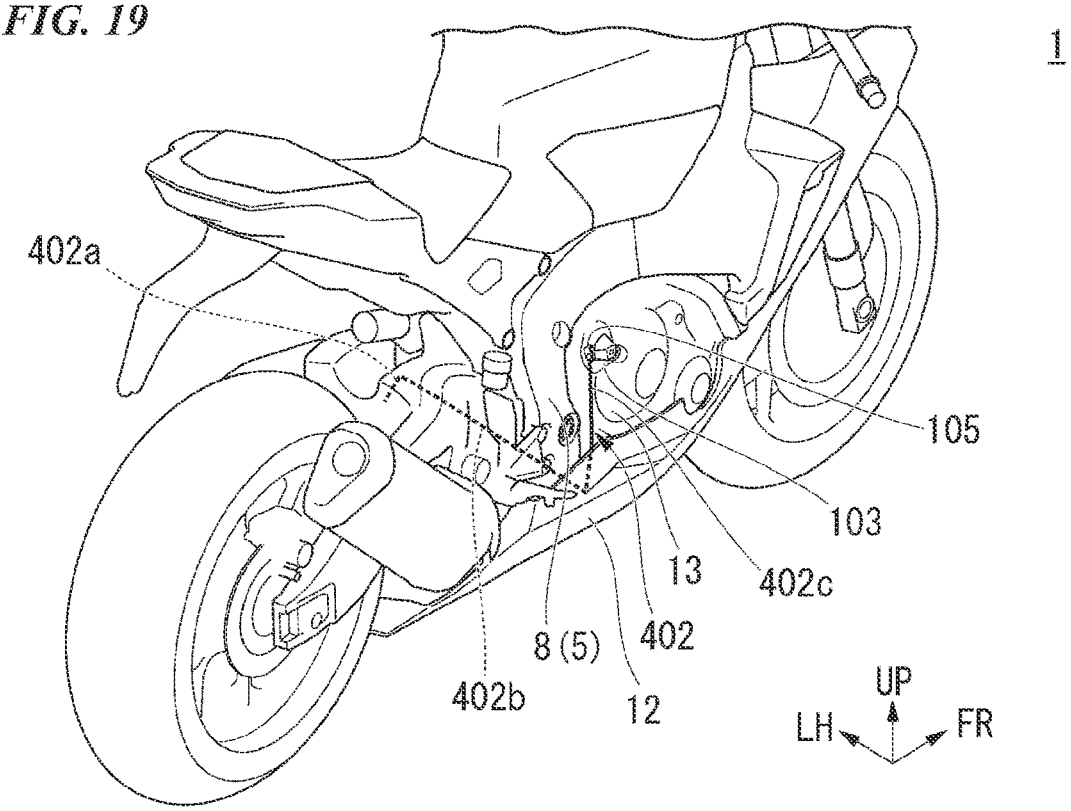
FIG. 19 is a perspective view of the right portion of the vehicle for explaining the wiring of wires according to the third modified example of the embodiment.

For example, as shown in FIG. 19, a wire 402 may be arranged below the engine 13. The wire 402 includes an upper extending portion 402a which extends upward from the end portion of the operator 101 (refer to FIG. 11) inside the pivot frame 8 in the vehicle width direction, a vehicle width direction extending portion 402b which extends below the engine 13 from an upper end portion of the upper extending portion 402a in the vehicle width direction, and a right upper extending portion 402c which extends upward from a right end portion of the vehicle width direction extending portion 402b toward the connecting member 105 (refer to FIG. 19). Part of the right upper extending portion 402c is arranged above part of the vehicle body cover 12 (for example, right and left under cowls). Although not shown, a holding portion for holding an intermediate portion (for example, a bent portion) of the wire 402 is provided in the vehicle body.

The present invention is not limited to the above-described embodiment, for example, the saddle type vehicle includes general vehicles in which a driver straddles a vehicle body, and not only motorcycles (including motorized bicycles and scooter type vehicles), but also three-wheeled vehicles (including front two-wheel and rear one-wheel vehicles in addition to front one-wheel and rear two-wheel vehicles). Further, the present invention can be applied not only to motorcycles but also to four-wheeled vehicles such as automobiles.

The configuration in the above-described embodiment is an example of the present invention, and various modifications can be made without departing from the gist of the present invention, such as replacing the constituent elements of the embodiment with well-known constituent elements.

BRIEF DESCRIPTION OF THE REFERENCE SYMBOLS

1 Motorcycle (saddle type vehicle)
22 Main shaft
26 Clutch
28 Slave cylinder (actuator)
29 Push rod
79 Stand
80 Clutch locking mechanism
81 Clutch center
82 Clutch outer
83 Pressure plate
100 Locking mechanism
101 Operator
102, 202, 302, 402 Wire
103 Arm
104 Clutch operating rod
P1 Initial position (position before operation of operator)
V1 Engagement direction

What is claim is:

1. A clutch locking mechanism mounted in a saddle type vehicle, comprising:
   a clutch, comprising a normally-open clutch, which enters an engaged state where power can be transmitted when an actuator is operated and returns to a disengaged state where power cannot be transmitted when the actuator is not operated; and
   a locking mechanism having an operator which is able to bring the clutch into the engaged state separately from an operation of the actuator, wherein the locking mechanism is able to hold the clutch in the engaged state when the vehicle is stopped, wherein the clutch locking mechanism further comprises a stand which is able to stand the saddle type vehicle,
   wherein the operator is operable only when the stand is in use.

2. The clutch locking mechanism according to claim 1, wherein the clutch includes a clutch center which is connected to a main shaft, a clutch outer which is provided outside the clutch center, and a pressure plate which is moved by the actuator and is able to connect the clutch center to the clutch outer, and
   the locking mechanism operates the pressure plate in an engagement direction by operating the operator.

3. The clutch locking mechanism according to claim 2, wherein the locking mechanism includes a wire which is connected to the operator, an arm which is connected to the wire and is rotatable, and a clutch operating rod which rotates in conjunction with rotation of the arm, and
   the locking mechanism operates the pressure plate in the engagement direction by rotation of the clutch operating rod.

4. The clutch locking mechanism according to claim 1, wherein the actuator is provided on one side of the saddle type vehicle in a vehicle width direction, and
   at least part of the locking mechanism is provided on a side opposite to the actuator in the vehicle width direction.

5. The clutch locking mechanism according to claim 1, wherein the operator returns to a position before the operation of the operator together with an operation in which the stand is retracted.

* * * * *